United States Patent
Koide et al.

(10) Patent No.: US 11,966,136 B2
(45) Date of Patent: *Apr. 23, 2024

(54) DISPLAY DEVICE

(71) Applicant: Japan Display Inc., Tokyo (JP)

(72) Inventors: Gen Koide, Tokyo (JP); Mamoru Douyou, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/139,098

(22) Filed: Apr. 25, 2023

(65) Prior Publication Data

US 2023/0258990 A1 Aug. 17, 2023

Related U.S. Application Data

(63) Continuation of application No. 17/120,648, filed on Dec. 14, 2020, now Pat. No. 11,640,092, which is a (Continued)

(30) Foreign Application Priority Data

Jun. 20, 2018 (JP) .................................. 2018-116726

(51) Int. Cl.
*G02F 1/1362* (2006.01)
*G02F 1/1345* (2006.01)
(Continued)

(52) U.S. Cl.
CPC ...... *G02F 1/13629* (2021.01); *G02F 1/13458* (2013.01); *G06F 3/0412* (2013.01);
(Continued)

(58) Field of Classification Search
CPC ............. G02F 1/13629; G02F 1/13458; G02F 1/13685; G02F 1/13338; G02F 1/134363; G06F 3/04164; G06F 3/0412; G06F 3/044

See application file for complete search history.

(56) References Cited

U.S. PATENT DOCUMENTS 10,824,259 B2 * 11/2020 Jin .................... G06F 3/0412
10,928,696 B2 * 2/2021 Kuroe ................. G09G 3/3677
(Continued)

FOREIGN PATENT DOCUMENTS

| JP | 2016200659 A | 12/2016 |
| JP | 2018018006 A | 2/2018 |
| WO | 2014112560 A1 | 7/2014 |
| WO | 2017033758 A1 | 3/2017 |
| WO | 2017159601 A1 | 9/2017 |
| WO | 2018003795 A1 | 1/2018 |

OTHER PUBLICATIONS

International Search Report issued in Application No. PCT/JP2019/021794, dated Aug. 27, 2019.

*Primary Examiner* — Peter D McLoone
(74) *Attorney, Agent, or Firm* — K&L Gates LLP

(57) ABSTRACT

A display device includes a substrate, a plurality of signal lines, a plurality of terminals, a plurality of wiring lines, metal wiring, a second metal layer, a third metal layer. In a first wiring region, each wiring line is composed of the first metal layer and extends in a second direction intersecting with the first direction. In a second wiring region between the first wiring region and the terminals, the wiring lines include the wiring line composed of the first metal layer and the second metal layer and the wiring line composed of the third metal layer. The metal wiring is provided in a different layer from the first metal layer; and intersects with the wiring lines in the first wiring region and extends in the first direction when viewed from a direction perpendicular to the substrate.

5 Claims, 18 Drawing Sheets

Related U.S. Application Data continuation of application No. PCT/JP2019/021794, filed on May 31, 2019.

(51) Int. Cl.
  *G06F 3/041*  (2006.01)
  *G06F 3/044*  (2006.01)
  *G02F 1/1333* (2006.01)
  *G02F 1/1343* (2006.01)
  *G02F 1/1368* (2006.01)

(52) U.S. Cl.
  CPC .......... *G06F 3/04164* (2019.05); *G06F 3/044* (2013.01); *G02F 1/13338* (2013.01); *G02F 1/134363* (2013.01); *G02F 1/13685* (2021.01)

(56) References Cited

U.S. PATENT DOCUMENTS

| | | |
|---|---|---|
| 2015/0356937 A1 | 12/2015 | Fujikawa |
| 2016/0300863 A1 | 10/2016 | Koide et al. |
| 2017/0365206 A1 | 12/2017 | Kim et al. |
| 2018/0031895 A1 | 2/2018 | Koide et al. |
| 2018/0068992 A1 | 3/2018 | Oh |
| 2018/0239180 A1 | 8/2018 | Ogasawara et al. |
| 2019/0079358 A1 | 3/2019 | Fujita et al. |
| 2020/0110497 A1 | 4/2020 | Jin et al. |
| 2020/0257154 A1 | 8/2020 | Fujita et al. |
| 2020/0301219 A1 | 9/2020 | Kuroe et al. |

\* cited by examiner

DISPLAY DEVICE

CROSS-REFERENCE TO RELATED APPLICATION

This application is a continuation of U.S. patent application Ser. No. 17/120,648, filed on Dec. 14, 2020, which claims the benefit of priority from Japanese Patent Application No. 2018-116726 filed on Jun. 20, 2018 and International Patent Application No. PCT/2019/021794 filed on May 31, 2019, the entire contents of which are incorporated herein by reference.

BACKGROUND

1. Technical Field

The present disclosure relates to a display device.

2. Description of the Related Art

Japanese Patent Application Laid-open Publication No. 2016-200659 discloses a display device that has a peripheral region as a non-display region provided with a large number of lead-out lines coupled to signal lines. The lead-out lines are formed through first wiring and second wiring provided in different layers. A display device with an electrostatic capacitive sensor that can detect an external proximity object using electrodes provided in a display region has been known. Such an electrostatic capacitive sensor has a configuration in which drive signal supply wiring for supplying a touch drive signal to the electrodes is provided in the peripheral region.

It is desired that the wiring resistance of the drive signal supply wiring is reduced by increasing the wiring width thereof. When the drive signal supply wiring and a large number of lead-out lines are provided in the peripheral regions along the same side of a substrate, it may be difficult to efficiently arrange a large number of wiring lines.

SUMMARY

According to an aspect, a display device includes: a substrate; a display region in which a plurality of pixels are provided; a peripheral region located between an edge of the substrate and the display region; a plurality of signal lines configured to supply signals to respective switching elements provided in the pixels; a plurality of terminals arrayed in a first direction in the peripheral region of the substrate; a plurality of wiring lines coupling the terminals and the signal lines in the peripheral region; metal wiring electrically coupled to a plurality of detection electrodes provided to the substrate; and a first metal layer, a second metal layer, a third metal layer, a first insulating film, and a second insulating film that are provided in the peripheral region, wherein the first metal layer, the second metal layer, and the third metal layer are provided in different layers in a direction perpendicular to the substrate, and wherein the first insulating film is provided between the first metal layer and the second metal layer, and the second insulating film is provided between the second metal layer and the third metal layer. In a first wiring region, each of the wiring lines is composed of the first metal layer and extends in a second direction intersecting with the first direction. In a second wiring region provided between the first wiring region and the terminals, the wiring lines include the wiring line composed of the first metal layer and the second metal layer and the wiring line composed of the third metal layer. The metal wiring is provided in a different layer from the first metal layer; and intersects with the wiring lines in the first wiring region and extends in the first direction when viewed from a direction perpendicular to the substrate.

DETAILED DESCRIPTION

Figure 1:
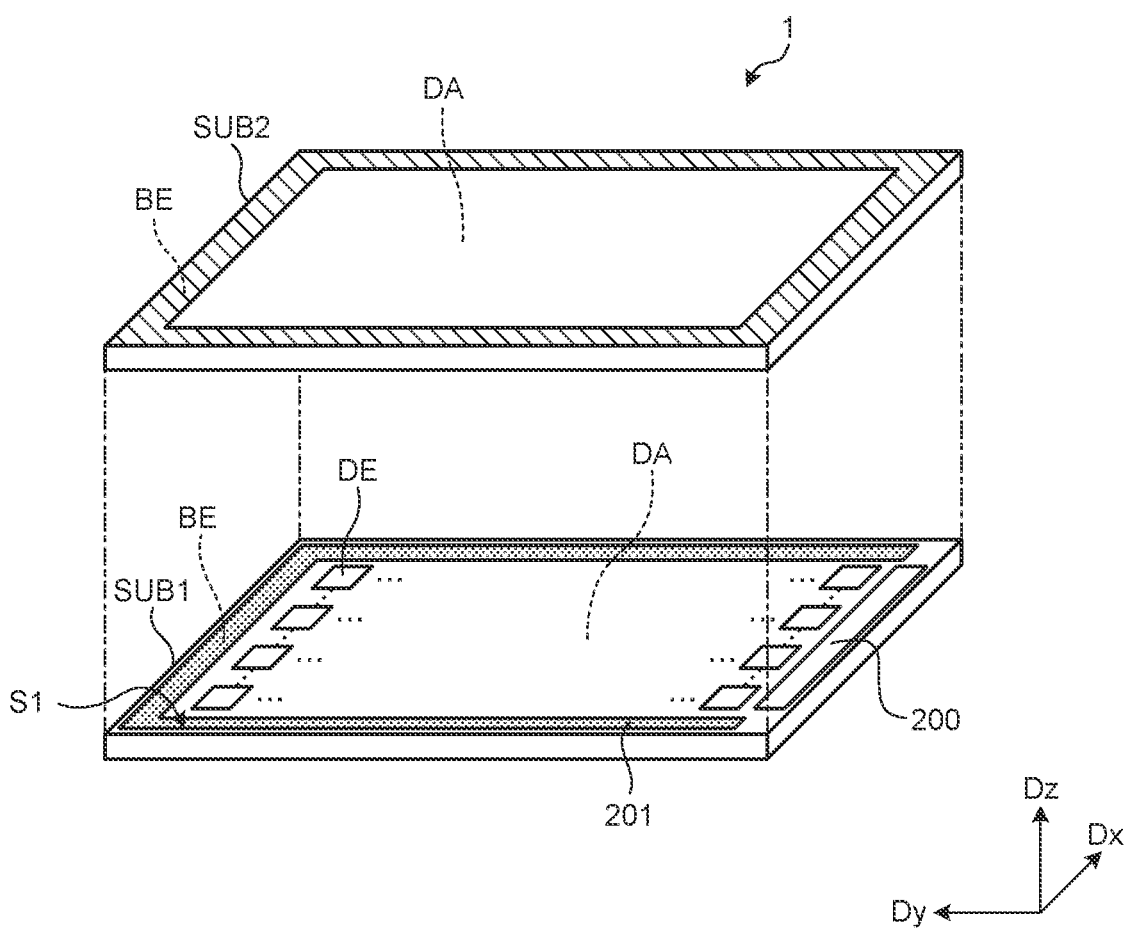
FIG. 1 is an exploded perspective view illustrating a display device according to an embodiment.

A mode (embodiment) for carrying out the present disclosure will be described in detail with reference to the drawings. Contents described in the following embodiment do not limit the present disclosure. Components described below include those that can be easily assumed by those skilled in the art and substantially the same components. Furthermore, the components described below can be appropriately combined. What is disclosed herein is merely an example, and it is needless to say that appropriate changes within the gist of the disclosure at which those skilled in the art can easily arrive are encompassed in the range of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

In this disclosure, when an element is described as being "on" another element, the element can be directly on the other element, or there can be one or more elements between the element and the other element.

Embodiment

FIG. 1 is an exploded perspective view illustrating a display device according to an embodiment. As illustrated in FIG. 1, a display device 1 includes an array substrate SUB1 and a counter substrate SUB2. In the display device 1, a peripheral region BE is provided outside a display region DA. The display region DA is formed to have a square shape but the outer shape of the display region DA is not limited thereto. For example, the display region DA may have a cutout, may have another polygonal shape, or may have another shape such as a circular shape and an elliptic shape.

In the embodiment, a first direction Dx is a direction along the short sides of the display region DA. A second direction Dy is a direction intersecting with (or orthogonal to) the first direction Dx. The second direction Dy is not limited thereto and may intersect with the first direction Dx at an angle other than 90°. A plane defined by the first direction Dx and the second direction Dy is parallel with a surface of the array substrate SUB1. A third direction Dz orthogonal to the first direction Dx and the second direction Dy corresponds to the thickness direction of the array substrate SUB1.

The display region DA is a region for displaying an image and is a region overlapping with a plurality of pixels Pix. The peripheral region BE is a region inside the outer circumference of the array substrate SUB1 and outside the display region DA. The peripheral region BE may have a frame shape surrounding the display region DA, and in this case, the peripheral region BE can also be referred to as a frame region.

The display region DA for displaying the image includes a sensor region included in a detection device that detects electrostatic capacitance. As illustrated in FIG. 1, a plurality of detection electrodes DE are arrayed in the display region DA in a matrix with a row-column configuration in the first direction Dx and the second direction Dy. Although the detection electrodes DE are schematically illustrated to have a rectangular shape or a square shape in plan view, they are not limited thereto and may have a polygonal shape, a parallelogram shape, or an irregular shape with a cutout or the like. The detection electrodes DE are made of, for example, a conductive material having translucency, such as indium tin oxide (ITO).

As illustrated in FIG. 1, a coupling circuit 200 and outer edge wiring 201 are provided in the peripheral region BE on one surface S1 side of the array substrate SUB1. For example, the outer edge wiring 201 is provided continuously along long sides and a short side of the display region DA and surrounds the three sides of the display region DA.

The display device 1 has a configuration in which the sensor region is integrated with the display region DA. To be specific, in the display device 1, some of the members in the display region DA correspond to the detection electrodes DE in the sensor region.

Figure 2:
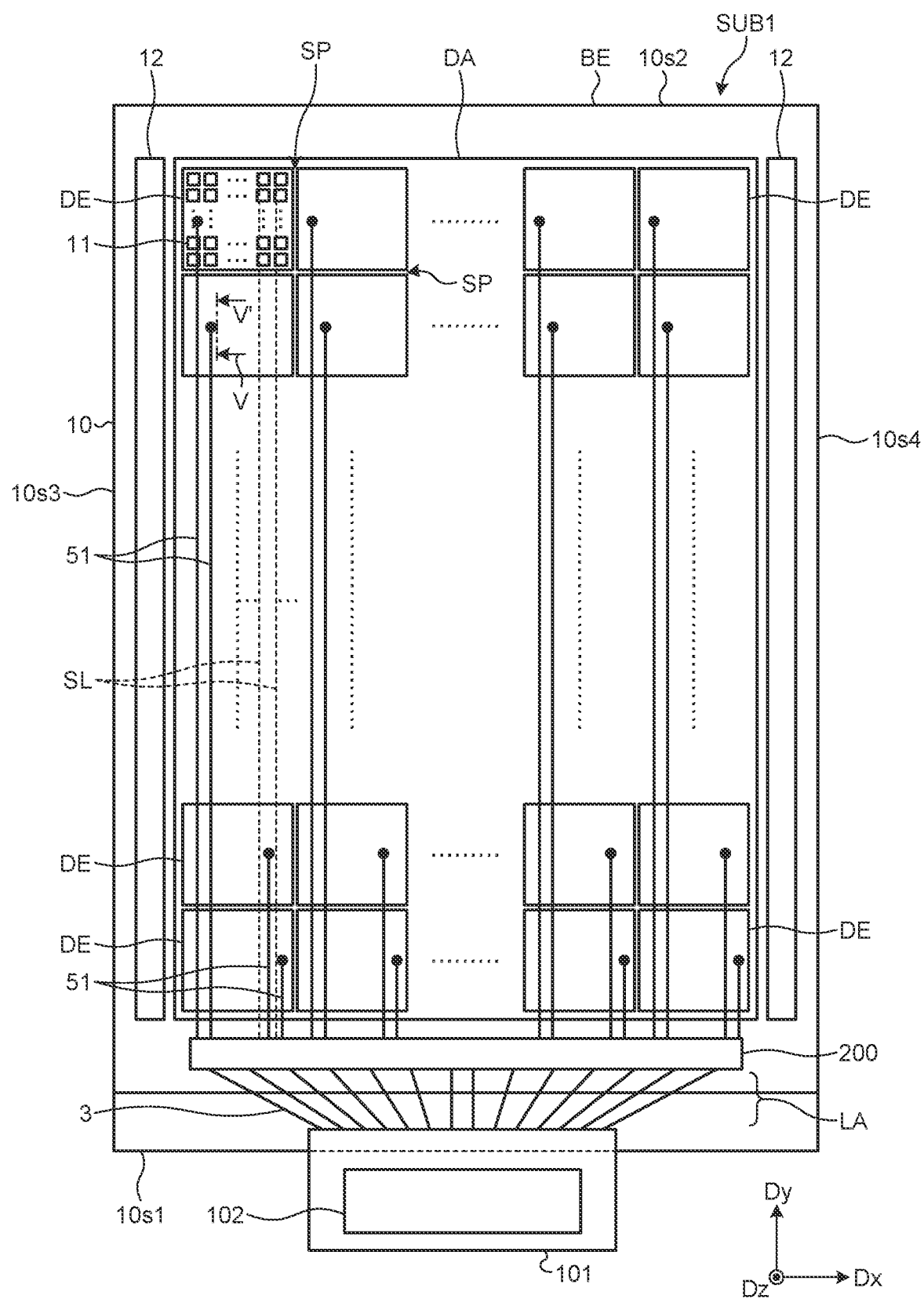
FIG. 2 is a plan view schematically illustrating an array substrate.

FIG. 2 is a plan view schematically illustrating the array substrate. As illustrated in FIG. 2, the detection electrodes DE are divided by slits SP into a matrix with the row-column configuration in the first direction Dx and the second direction Dy. A plurality of pixel electrodes 11 are arranged in a matrix with a row-column configuration in a region corresponding to one detection electrode DE. Each pixel electrode 11 has an area smaller than the detection electrode DE does. Although FIG. 2 illustrates some detection electrodes DE and some pixel electrodes 11, the detection electrodes DE and the pixel electrodes 11 are arranged over the entire display region DA.

A first insulating substrate 10 of the array substrate SUB1 has a side 10$s$1, a side 10$s$2, a side 10$s$3, and a side 10$s$4. The side 10$s$1 extends along the first direction Dx in plan view. The side 10$s$2 opposes the side 10$s$1. The side 10$s$3 extends along the second direction Dy. The side 10$s$4 opposes the side 10$s$3.

The peripheral region BE is located between edges of the first insulating substrate 10 and the display region DA. The coupling circuit 200 and a wiring substrate 101 are provided on a short side of the peripheral region BE, that is, in a region of the peripheral region BE along the side 10$s$1. The wiring substrate 101 is configured by flexible printed circuits (FPC), for example. The wiring substrate 101 is bonded to the first insulating substrate 10 with a film on glass (FOG) using an anisotropic conductive film (ACF), for example (hereinafter, referred to as "FOG mounting"). With this manner, wiring lines on the first insulating substrate 10 and wiring lines on the wiring substrate 101 are electrically coupled to each other.

A driver integrated circuit (IC) 102 is provided on the wiring substrate 101. The driver IC 102 includes a control circuit that controls display of the display device 1, a detection circuit, and an analog front end. The driver IC 102 is mounted on the wiring substrate 101 by a chip on film (COF) using the ACF, for example (hereinafter, referred to as "COF mounting"). The driver IC 102 is not limited to this example and may be chip on glass (COG)-mounted on the first insulating substrate 10. In this case, the driver IC 102 is provided between terminals T to which the wiring substrate 101 is coupled, and the coupling circuit 200. Arrangement of the driver IC 102 is not limited thereto, and the driver IC 102 may be provided on a control substrate or a flexible substrate outside the module, for example.

The detection electrodes DE are electrically coupled to the driver IC 102 through sensor wiring lines 51 and the coupling circuit 200. The sensor wiring lines 51 are electrically coupled to the detection electrodes DE, respectively, and are led out to the peripheral region BE. Each of the sensor wiring lines 51 extends along the second direction Dy, and the sensor wiring lines 51 are arranged in the first direction Dx.

The pixel electrodes 11 are electrically coupled to the driver IC 102 through signal lines SL and the coupling circuit 200. The signal lines SL are electrically coupled to the pixel electrodes 11 aligned in the first direction Dx, respectively, and are led out to the peripheral region BE. Each of the signal lines SL extends along the second direction Dy, and the signal lines SL are arranged in the first direction Dx.

The coupling circuit 200 is electrically coupled to the wiring substrate 101 through a plurality of wiring lines 3 provided in a wiring region LA. The coupling circuit 200 switches between coupling and uncoupling the signal lines SL and the driver IC 102. The coupling circuit 200 switches between coupling and uncoupling the sensor wiring lines 51 and the driver IC 102.

Figure 3:
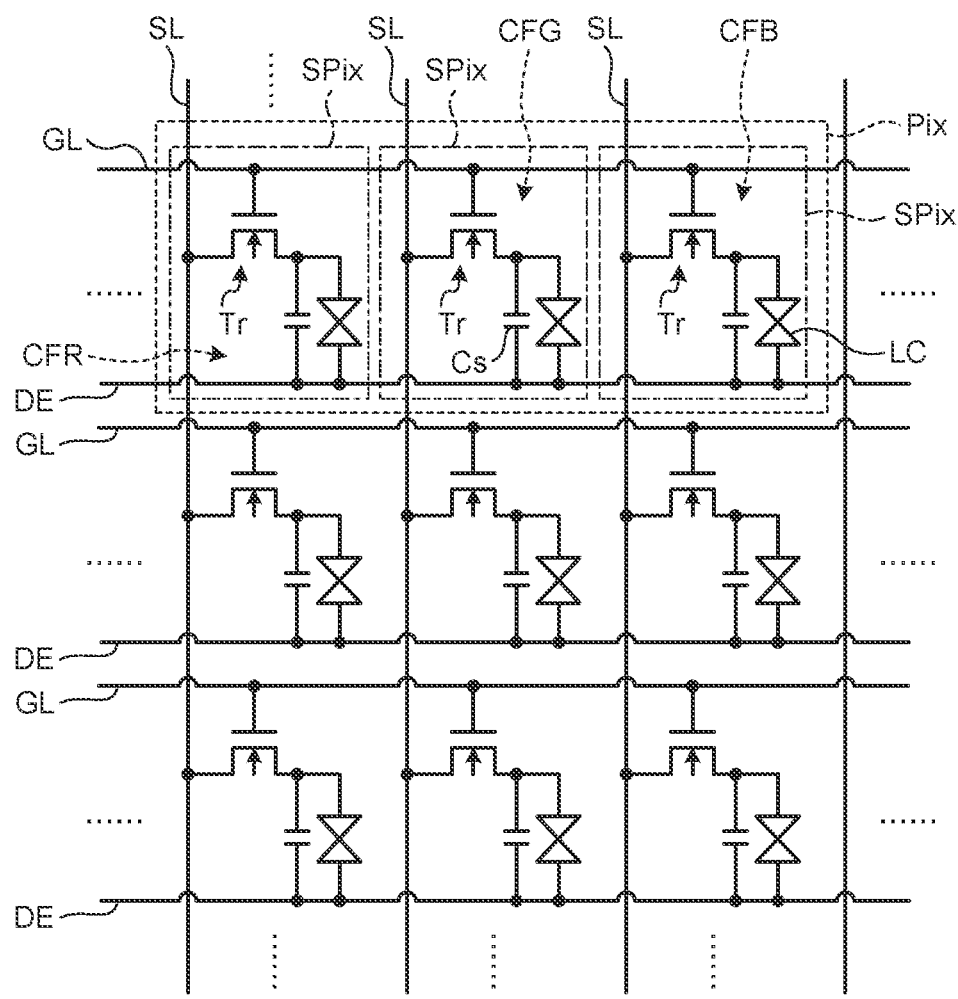
FIG. 3 is a circuit diagram illustrating a pixel array of a display region.

FIG. 3 is a circuit diagram illustrating a pixel array of the display region. Switching elements Tr of respective sub pixels SPix, the signal lines SL, scan lines GL, and the like illustrated in FIG. 3 are formed on the array substrate SUB1.

The signal lines SL are wiring lines for supplying pixel signals to the pixel electrodes 11 (see FIG. 2). The scan lines GL are wiring lines for supplying gate signals for driving the switching elements Tr.

Each pixel Pix includes a plurality of sub pixels SPix. Each sub pixel SPix includes the switching element Tr and a capacitance of a liquid crystal layer LC. The switching element Tr is fabricated from a thin film transistor and, in this example, is fabricated from an re-channel metal oxide semiconductor (MOS)-type TFT. A sixth insulating film 96 (see FIG. 4) is provided between the pixel electrodes 11 and the detection electrodes DE (which will be described later), and they form holding capacitances Cs illustrated in FIG. 3.

As color filters CFR, CFG, and CFB illustrated in FIG. 3, color areas colored in three colors: red (R), green (G), and blue (B), for example, are periodically arrayed. The color areas of the three colors of R, G, and B as one set are made to correspond to the sub pixels SPix. A set of the sub pixels SPix corresponding to the color areas of the three colors constitute the pixel Pix. The color filters may include color areas of equal to or more than four colors. In this case, the pixel Pix may include equal to or more than four sub pixels SPix.

Figure 4:
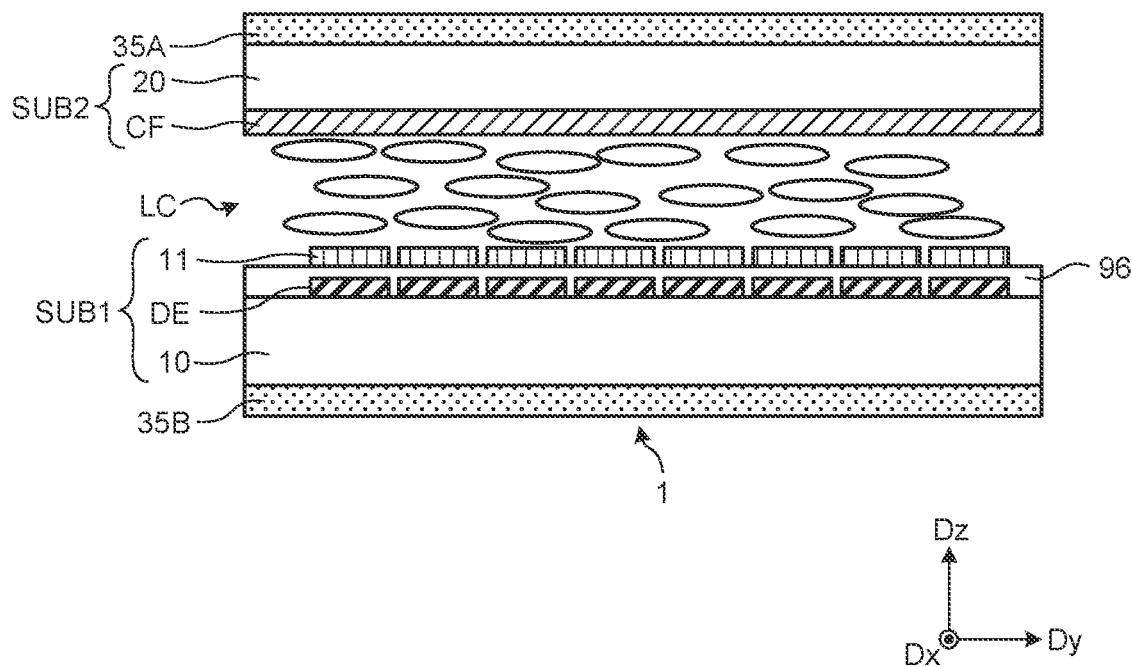
FIG. 4 is a cross-sectional view illustrating the schematic cross-sectional configuration of the display device.
Figure 5:
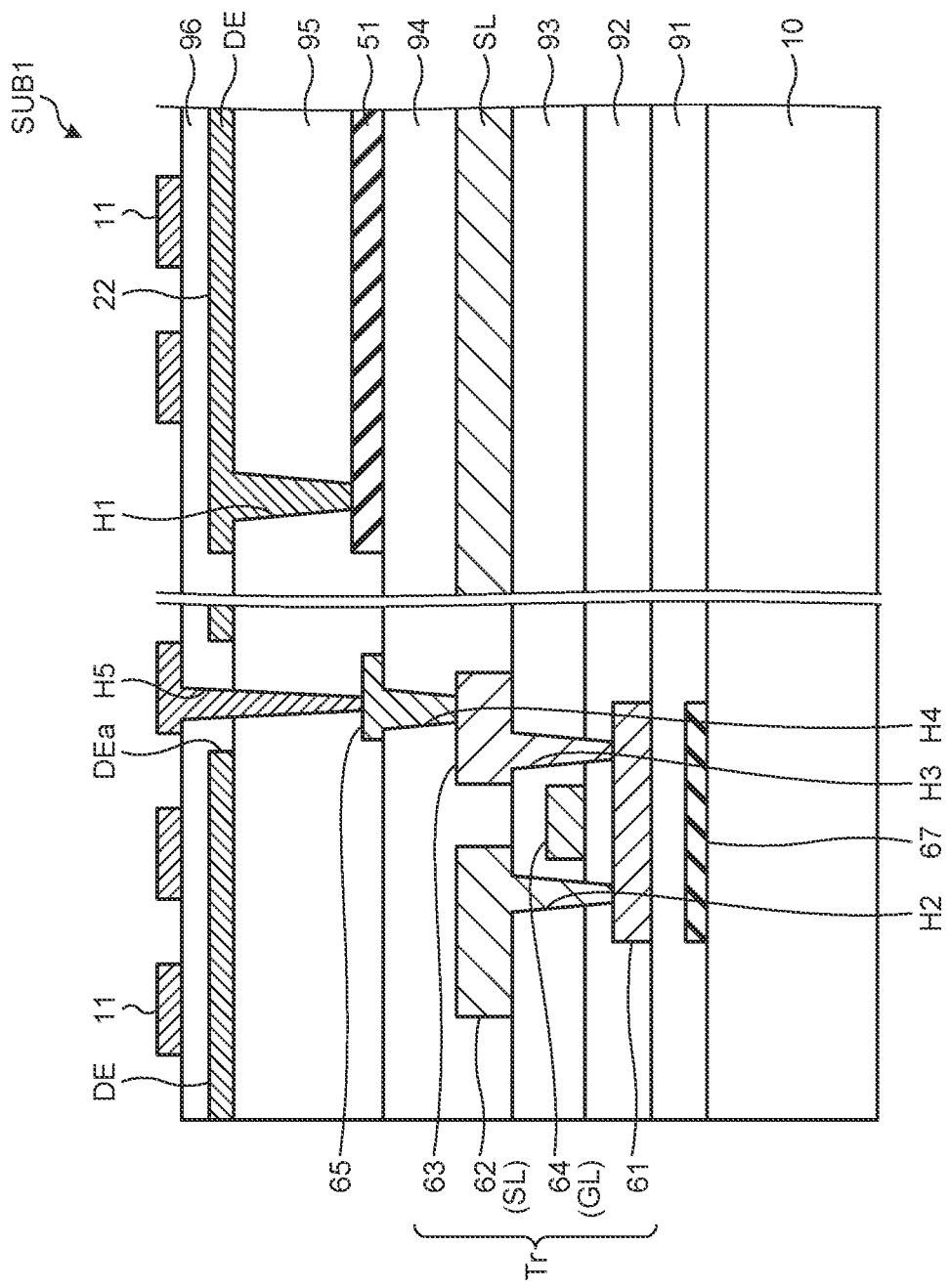
FIG. 5 is a cross-sectional view taken along line V-V' in FIG. 2.

FIG. 4 is a cross-sectional view illustrating the schematic cross-sectional configuration of the display device. FIG. 5 is a cross-sectional view taken along line V-V' in FIG. 2. FIG. 5 schematically illustrates a multilayered structure of the switching element Tr included in the sub pixel SPix.

As illustrated in FIG. 4, the counter substrate SUB2 is arranged so as to oppose the surface of the array substrate SUB1 in the perpendicular direction. The liquid crystal layer LC is provided between the array substrate SUB1 and the counter substrate SUB2.

The array substrate SUB1 includes the first insulating substrate 10, the pixel electrodes 11, the detection electrodes DE, and the sixth insulating film 96. Circuits such as gate scanner circuits 12 (see FIG. 2), the switching elements Tr such as thin film transistors (TFTs), and various wiring lines (not illustrated in FIG. 4) such as the scan lines GL and the signal lines SL are provided on the first insulating substrate 10.

The detection electrodes DE are provided on the upper side of the first insulating substrate 10. The pixel electrodes 11 are provided on the upper side of the detection electrodes DE with the sixth insulating film 96 in between and are arranged in a matrix with the row-column configuration in plan view. The pixel electrodes 11 are provided so as to correspond to the sub pixels SPix and supplied with pixel signals for a display operation. The detection electrodes DE are supplied with a display drive signal in display and function as common electrodes to the pixel electrodes 11. A polarizing plate 35B is provided on the lower side of the first insulating substrate 10. In the embodiment, the pixel electrodes 11 and the detection electrodes DE are made of, for example, the conductive material having translucency, such as ITO.

In the present specification, the direction toward a second insulating substrate 20 from the first insulating substrate 10 in the direction perpendicular to the first insulating substrate 10 is an "upper side direction" or simply an "upward direction". The direction toward the first insulating substrate 10 from the second insulating substrate 20 is a "lower side direction" or simply a "downward direction". The expression "in plan view" indicates the case when viewed from the direction perpendicular to the first insulating substrate 10.

The counter substrate SUB2 includes the second insulating substrate 20 and the color filters CF formed on one surface of the second insulating substrate 20. The color filters CF oppose the liquid crystal layer LC in the direction perpendicular to the first insulating substrate 10. The color filters CF may be arranged directly on the first insulating substrate 10. In the embodiment, the first insulating substrate 10 and the second insulating substrate 20 are, for example, glass substrates or resin substrates. A polarizing plate 35A is provided on the other surface of the second insulating substrate 20.

The first insulating substrate 10 and the second insulating substrate 20 are arranged so as to oppose each other with a predetermined interval therebetween. The liquid crystal layer LC is provided between the first insulating substrate 10 and the second insulating substrate 20. In the liquid crystal layer LC, orientation states of liquid crystal molecules change in accordance with a state of an electric field formed between the layers, and transmitted light is thereby modulated. As an electric field mode thereof, for example, a transverse electric field mode such as in-plane switching (IPS) including fringe field switching (FFS) is employed. An orientation film (not illustrated in FIG. 5) defining an initial orientation state of the liquid crystal molecules is formed on each of the outermost surface of the array substrate SUB1 opposing the liquid crystal layer LC and the outermost surface of the counter substrate SUB2.

An illuminator (backlight) (not illustrated) is provided on the lower side of the first insulating substrate 10. The illuminator, for example, includes a light source such as a light emitting diode (LED) and emits, toward the first insulating substrate 10, light from the light source. The light from the illuminator passes through the array substrate SUB1 and is modulated in accordance with the orientation state of the liquid crystal at the corresponding position, so that the transmittance state thereof to a display surface changes depending on places. An image is thereby displayed on the display surface.

As illustrated in FIG. 5, each switching element Tr includes a semiconductor 61, a source electrode 62, a drain electrode 63, and a gate electrode 64. The semiconductor 61 is provided above the first insulating substrate 10 with a first insulating film 91 in between. A light shielding layer 67 is provided between the first insulating substrate 10 and the semiconductor 61 in the direction perpendicular to the first insulating substrate 10. The light shielding layer 67 may be made of a metal material such as molybdenum (Mo) and chromium (Cr) or may be made of a non-conductive material such as black resin. The first insulating film 91, a second insulating film 92, a third insulating film 93, and the sixth insulating film 96 are made of an inorganic insulating material such as a silicon oxide film (SiO), a silicon nitride film (SiN), and a silicon oxynitride film (SiON). Each inorganic insulating film is not limited to a single layer and may be a multilayered film.

The second insulating film 92 covers the semiconductor 61 and is provided on the first insulating film 91. The gate electrode 64 is provided on the second insulating film 92. The gate electrode 64 is a portion of the scan line GL that overlaps with the semiconductor 61. The third insulating film 93 covers the semiconductor 61 and is provided on the second insulating film 92. A channel region is formed on a portion of the semiconductors 61 that overlaps with the gate electrode 64.

In the example illustrated in FIG. 5, the switching element Tr has what is called a top gate structure. It should be noted that the switching element Tr may have a bottom gate structure in which the gate electrode 64 is provided on the lower side of the semiconductor 61. The switching element Tr may have a dual gate structure in which the gate electrodes 64 are provided with the semiconductors 61 interposed therebetween in the direction perpendicular to the first insulating substrate 10.

The source electrode 62 and the drain electrode 63 are provided on the third insulating film 93. In the embodiment, the source electrode 62 is electrically coupled to the semiconductor 61 through a contact hole H2. The drain electrode 63 is electrically coupled to the semiconductor 61 through a contact hole H3. The source electrode 62 is a portion of the signal line SL that overlaps with the semiconductor 61.

A fourth insulating film 94 and a fifth insulating film 95 cover the source electrode 62 and the drain electrode 63 and are provided on the upper side of the third insulating film 93. The fourth insulating film 94 and the fifth insulating film 95 are organic insulating films and are flattening films for flattening irregularities formed due to the switching elements Tr and various wiring lines. The fifth insulating film 95 is not limited to the organic insulating film and may be an inorganic insulating film. When the fifth insulating film 95 is formed of the inorganic insulating film, increase in thickness thereof is required for flattening, reduction in parasitic capacitance, and the like, in some cases. Thus, the fifth insulating film 95 may be formed by stacking a plurality of inorganic insulating films.

Relay electrodes 65 and the sensor wiring lines 51 are provided on the upper side of the fourth insulating film 94. The relay electrodes 65 are electrically coupled to the drain electrodes 63 through contact holes H4. The sensor wiring lines 51 are provided above the signal lines SL. The sensor wiring lines 51 respectively overlap with the signal lines SL and extend in parallel with the signal lines SL in plan view. The detection electrodes DE are provided on the fifth insulating film 95. The detection electrodes DE are electrically coupled to the sensor wiring lines 51 through contact holes H1.

The pixel electrodes 11 are electrically coupled to the relay electrodes 65 through contact holes H5 provided in the sixth insulating film 96 and the fifth insulating film 95. The contact holes H5 are formed at positions overlapping with openings DEa of the detection electrodes DE. With the above-mentioned configuration, the pixel electrodes 11 are coupled to the switching elements Tr.

Figure 6:
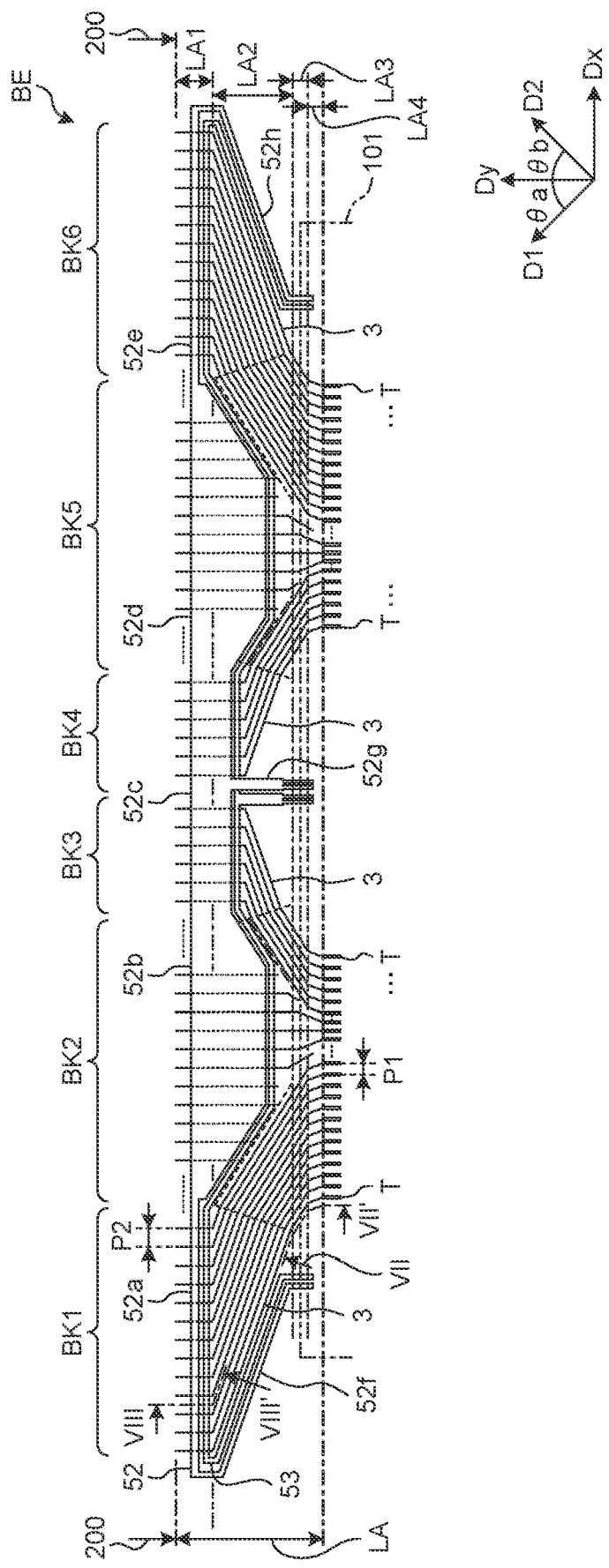
FIG. 6 is a plan view illustrating a wiring region.
Figure 7:
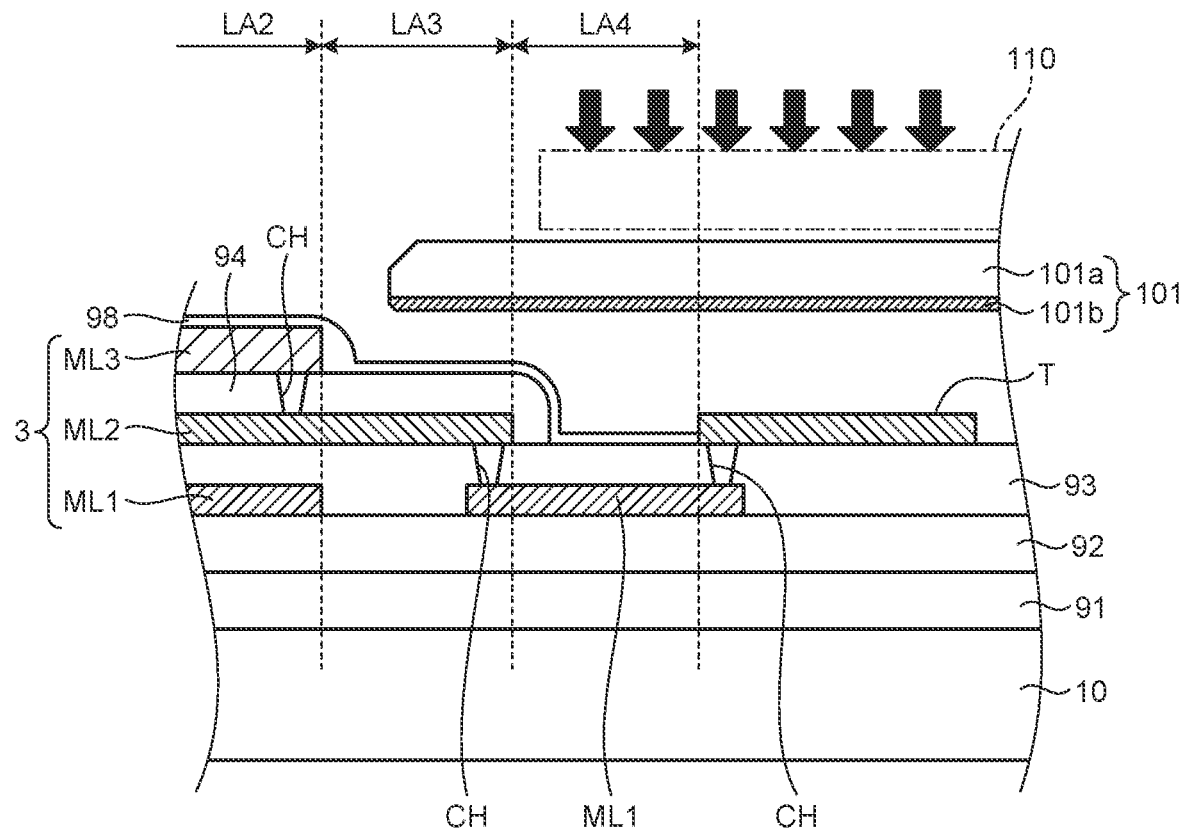
FIG. 7 is a cross-sectional view taken along line VII-VII' in FIG. 6.
Figure 8:
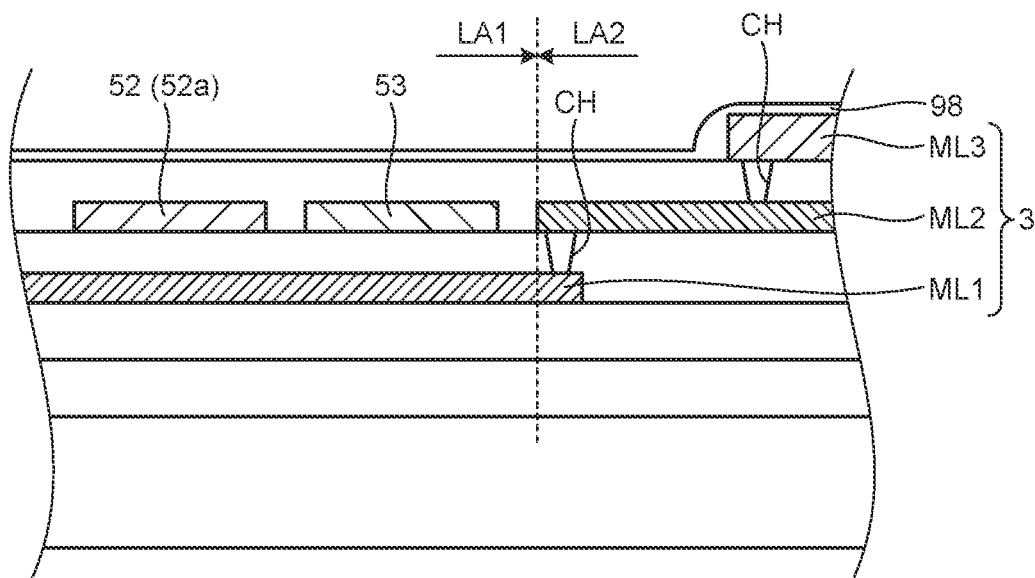
FIG. 8 is a cross-sectional view taken along line VIII-VIII' in FIG. 6.

Next, the configuration of the wiring region LA will be described in detail. FIG. 6 is a plan view illustrating the wiring region. FIG. 7 is a cross-sectional view taken along line VII-VII' in FIG. 6. FIG. 8 is a cross-sectional view taken along line VIII-VIII' in FIG. 6.

As illustrated in FIG. 6, the terminals T, the wiring lines 3, first drive signal supply wiring 52, and second drive signal supply wiring 53 are provided in the peripheral region BE of the first insulating substrate 10. The terminals T are arrayed in the first direction Dx and are arranged to be away from the coupling circuit 200 in the second direction Dy. The terminals T are FOG terminals that are coupled to the wiring substrate 101 (indicated by a chain double-dashed line in FIG. 6). The terminals T may be a plurality of COG terminals on which the driver IC 102 is mounted when the driver IC 102 is the chip on glass (COG) mounted on the array substrate SUB1.

The wiring lines 3 are respectively coupled to the terminals T and extend in the direction inclined with respect to the second direction Dy. The wiring lines 3 couple the terminals T and the coupling circuit 200. With an operation of the coupling circuit 200, the wiring lines 3 couple the signal lines SL and the terminals T or couple the sensor wiring lines 51 and the terminals T.

As illustrated in FIG. 6, a first wiring block BK1, a second wiring block BK2, a third wiring block BK3, a fourth wiring block BK4, a fifth wiring block BK5, and a sixth wiring block BK6 are arranged in the first direction Dx in the order as listed. Each of the first wiring block BK1, the second wiring block BK2, the third wiring block BK3, the fourth wiring block BK4, the fifth wiring block BK5, and the sixth wiring block BK6 has the wiring lines 3; and an inclination angle of the wiring lines 3 and a layer structure of a first metal layer ML1, a second metal layer ML2, and a third metal layer ML3 (see FIG. 7) forming the wiring lines 3 is different among the blocks.

The first wiring block BK1, the second wiring block BK2, and the third wiring block BK3 are linearly symmetric with the fourth wiring block BK4, the fifth wiring block BK5, and the sixth wiring block BK6 with respect to a virtual line parallel with the second direction Dy as a symmetric axis. Explanation of the first wiring block BK1, the second wiring block BK2, and the third wiring block BK3 can be applied also to the fourth wiring block BK4, the fifth wiring block BK5, and the sixth wiring block BK6.

In the embodiment, a region between ends of the terminals T and the coupling circuit 200 is the wiring region LA. The wiring region LA has a first wiring region LA1, a second wiring region LA2, a third wiring region LA3, and a fourth wiring region LA4. The first wiring region LA1, the second wiring region LA2, the third wiring region LA3, and the fourth wiring region LA4 have predetermined widths in the second direction Dy and extend in the first direction Dx. The first wiring region LA1 is a region in which the wiring lines 3 are coupled to the coupling circuit 200. The second wiring region LA2 is coupled to the first wiring region LA1 and is provided between the first wiring region LA1 and the terminals T. The third wiring region LA3 is coupled to the second wiring region LA2 and is provided between the second wiring region LA2 and the terminals T. The fourth wiring region LA4 is a region in which the wiring lines 3 are coupled to the terminals T and is provided between the third wiring region LA3 and the terminals T.

The second wiring block BK2 is provided between the first wiring block BK1 and the third wiring block BK3. The wiring lines 3 of the first wiring block BK1 extend from portions coupled to the terminals T in a first inclination direction D1 inclined with respect to the second direction Dy. A first inclination angle θa of the first wiring block BK1 is set to be different among the wiring regions. The first inclination angle θa of the first wiring block BK1 is increased in the order of the fourth wiring region LA4, the third wiring region LA3, and the second wiring region LA2. The first wiring block BK1 extends in the second direction Dy in the first wiring region LA1 and is coupled to the coupling circuit 200. The detail configuration of the wiring lines 3 in each wiring region will be described later.

The wiring lines 3 of the second wiring block BK2 include the wiring lines 3 extending from portions coupled to the terminals T in the first inclination direction D1 and the wiring lines 3 extending therefrom in a second inclination direction D2. The second inclination direction D2 is a direction opposite to the first inclination direction D1 with respect to the second direction Dy. At least some of the wiring lines 3 of the second wiring block BK2 extend in the second direction Dy in the second wiring region LA2. In the second wiring block BK2, the lengths of portions of the wiring lines 3 that extend in the second direction Dy are different from one another. Of the lengths of the portions of the wiring lines 3 that extend in the second direction Dy, that of the wiring line 3 located at the center of the second wiring block BK2 in the first direction Dx is the longest; and the length of the portion of the wiring line 3 that extends in the second direction Dy is decreased as the wiring line 3 is closer to the first wiring block BK1 and the third wiring block BK3. As described above, the second wiring block BK2 is provided so as to be adapted to the inclination angles of the first wiring block BK1 and the third wiring block BK3. The second wiring block BK2 extends in the second direction Dy in the first wiring region LA1 and is coupled to the coupling circuit 200.

The wiring lines 3 of the third wiring block BK3 extend in the second inclination direction D2 in the second wiring region LA2. A second inclination angle θb of the third wiring block BK3 is set to be different among the wiring regions. The second inclination angle θb of the third wiring block BK3 is increased in the order of the fourth wiring region LA4, the third wiring region LA3, and the second wiring region LA2. The third wiring block BK3 extends in the second direction Dy in the first wiring region LA1 and is coupled to the coupling circuit 200.

With the above-mentioned configuration, an arrangement pitch P2 of portions of the wiring lines 3 that are coupled to the coupling circuit 200 is greater than an arrangement pitch P1 of the terminals T. An arrangement pitch of the wiring lines 3 of the first wiring block BK1 and the third wiring block BK3 in the second wiring region LA2 is less than an arrangement pitch of the wiring lines 3 of the second wiring block BK2 in a region overlapping with a second portion 52b.

As illustrated in FIG. 7, each wiring line 3 has the first metal layer ML1, the second metal layer ML2, and the third metal layer ML3 provided in the different layers. The first metal layer ML1 is provided on the second insulating film 92. That is to say, the first metal layer ML1 is a wiring layer in the same layer as the scan lines GL (see FIG. 5) and is made of the same material as the scan lines GL are. The second metal layer ML2 and the terminal T are provided on the third insulating film 93. That is to say, the second metal layer ML2 and the terminal T are a wiring layer that is the same layer as the signal lines SL (see FIG. 5) and are made of the same material as the signal lines SL are. The third metal layer ML3 is provided on the fourth insulating film 94. That is to say, the third metal layer ML3 is a wiring layer in the same layer as the sensor wiring lines 51 (see FIG. 5) and is made of the same material as the sensor wiring lines 51 are. An insulating film 98 covers the third metal layer ML3 and is provided on the third insulating film 93 and the fourth insulating film 94. The insulating film 98 is, for example, a nitride film. The terminal T in FIG. 7 is composed of only the second metal layer ML2, which is illustrated for easy understanding, but the terminal T is not limited thereto. Each terminal T may have a structure in which the third metal layer ML3 and/or a conductive material having translucency, such as ITO, are/is stacked in addition to the second metal layer ML2.

The first metal layer ML1 in the same layer as the scan lines GL is desired to have resistance to heat processing in many cases. The first metal layer ML1 is therefore made of metal material having a high melting point, such as molybdenum (Mo) and chromium (Cr). On the other hand, the signal lines SL can be formed after the heat processing. The second metal layer ML2 in the same layer as the signal lines SL can therefore be made of a metal material having low resistance, such as aluminum (Al). The third metal layer ML3 can also be made of the metal material having low resistance, such as aluminum (Al), like the second metal layer ML2. Each of the first metal layer ML1, the second metal layer ML2, and the third metal layer ML3 is not limited to being formed of a signal layer of metal but may be formed by stacking a plurality of types of metal and/or metal oxide such as indium oxide. For example, wiring formed of a multilayered film of titanium (Ti)/aluminum (Al)/titanium (Ti), molybdenum (Mo)/aluminum (Al)/molybdenum (Mo), molybdenum (Mo)/indium oxide, or chromium (Cr)/indium oxide can be used.

The first metal layer ML1 and the second metal layer ML2 are electrically coupled to each other through a contact portion CH provided in the third insulating film 93. The first metal layer ML1 and the terminal T is electrically coupled to each other through a contact portion CH provided in the third insulating film 93. The second metal layer ML2 and the third metal layer ML3 are electrically coupled to each other through a contact portion CH provided in the fourth insulating film 94.

The wiring substrate 101 has a base material 101a and a wiring substrate terminal portion 101b. In the FOG mounting, the wiring substrate 101 is crimped to the terminals T by a crimping head 110, and the wiring substrate terminal portion 101b of the wiring substrate 101 is electrically coupled to the terminals T by ACF or the like (not illustrated). The crimping head 110 is arranged in a region overlapping with the terminals T and the fourth wiring region LA4. The wiring substrate 101 is arranged in the region overlapping with the terminals T, the fourth wiring region LA4, and a part of the third wiring region LA3. Force by the crimping head 110 is therefore applied also to a part of the wiring lines 3 in the fourth wiring region LA4, and the force can be applied also to a part of the wiring lines 3 in the third wiring region LA3 through the wiring substrate 101.

In the embodiment, each of the wiring lines 3 is composed of the first metal layer ML1 in the fourth wiring region LA4. That is to say, the wiring lines 3 do not have the second metal layer ML2 and the third metal layer ML3 in the fourth wiring region LA4. With this formation manner, even when the force from the crimping head 110 is applied to the fourth wiring region LA4, a short circuit does not occur between the metal layers provided in the different layers.

Each of the wiring lines 3 is formed through the first metal layer ML1 and the second metal layer ML2 in the third wiring region LA3. That is to say, the wiring lines 3 do not have the third metal layer ML3 in the third wiring region LA3. With this formation manner, even when the force from the crimping head 110 is applied to the third wiring region LA3 through the wiring substrate 101, a short circuit does not occur between the second metal layer ML2 and the third metal layer ML3 provided in the different layers. The fourth insulating film 94 as a flattening film is provided on the second metal layer ML2 to thereby prevent a short circuit between the second metal layer ML2 and the wiring substrate terminal portion 101b.

In the second wiring region LA2, the wiring lines 3 have the first metal layer ML1, the second metal layer ML2, and the third metal layer ML3 and include the wiring lines 3 composed of the first metal layer ML1 and the second metal layer ML2 and the wiring lines 3 composed of the third metal layer ML3. The wiring lines 3 can thereby improve the degree of freedom in routing in the second wiring region LA2 and can make the arrangement pitch of the wiring lines 3 less than the arrangement pitch thereof in the fourth wiring region LA4 in plan view.

As illustrated in FIG. 8, each of the wiring lines 3 is composed of the first metal layer ML1 in the first wiring region LA1. That is to say, the wiring lines 3 do not have the second metal layer ML2 and the third metal layer ML3 in the first wiring region LA1.

Although the layer structures of the wiring lines in FIG. 7 and FIG. 8 have been explained for the first wiring block BK1, these layer structures can be applied also to the third wiring block BK3, the fourth wiring block BK4, and the sixth wiring block BK6. The second wiring block BK2 and the fifth wiring block BK5 are each composed of the first metal layer ML1 in the first wiring region LA1 to the fourth wiring region LA4 and do not have the second metal layer ML2 and the third metal layer ML3.

As illustrated in FIG. 6, the first drive signal supply wiring 52 and the second drive signal supply wiring 53 are provided so as to intersect with the wiring lines 3 in plan view and are coupled to the wiring substrate 101. The first drive signal supply wiring 52 is metal wiring that is electrically coupled to the detection electrodes DE and supplies the touch drive signal to the detection electrodes DE through the sensor wiring lines 51 in touch detection. The second drive signal supply wiring 53 is wiring that supplies the display drive signal to the detection electrodes DE through the sensor wiring lines 51 in display.

The display device 1 performs the touch detection and the display in a time division manner. The display device 1 may execute display processing and detection processing during a display period of an image for one frame by alternately setting a plurality of display periods and detection periods during the one frame display period. In the display processing, the driver IC 102 (see FIG. 2) supplies video image signals to the sub pixels SPix through the wiring lines 3, the coupling circuit 200, and the signal lines SL. The driver IC 102 supplies the display drive signal to all of the detection electrodes DE through the wiring lines 3, the coupling circuit 200, and the sensor wiring lines 51. The detection electrodes DE thereby serve as common electrodes applying a common potential.

In the touch detection, the driver IC 102 supplies the touch drive signal for detection to the detection electrodes DE. The driver IC 102 may supply a guard signal in synchronization with the touch drive signal with the same waveform as that of the touch drive signal to the outer edge wiring 201 illustrated in FIG. 1. Alternatively, in the touch detection, the outer edge wiring 201 may be set into a (high-impedance) state in which it is electrically coupled to nothing. Detection signals depending on changes in the capacitances of the detection electrodes DE are supplied to the detection circuit of the driver IC 102 through the coupling circuit 200 and the wiring lines 3. The display device 1 can thereby detect a detection target object in a contact state or a proximity state on a detection electrode DE basis.

A drive method for the touch detection is not limited to a self-capacitance system and may be a mutual-capacitance system.

As illustrated in FIG. 6, the first drive signal supply wiring 52 has a first portion 52a, the second portion 52b, a third portion 52c, a fourth portion 52d, and a fifth portion 52e extending in the first direction Dx. An end portion of the first portion 52a is coupled to the wiring substrate 101 through a power feeder 52f. An intermediate portion of the third portion 52c is coupled to the wiring substrate 101 through a power feeder 52g. An end portion of the fifth portion 52e is coupled to the wiring substrate 101 through a power feeder 52h. In the embodiment, power is fed to the first drive signal supply wiring 52 at three places by the power feeders 52f, 52g, and 52h.

The first portion 52a, the second portion 52b, the third portion 52c, the fourth portion 52d, and the fifth portion 52e of the first drive signal supply wiring 52 intersect with the wiring lines 3 in the first wiring region LA1 and extend in the first direction Dx in plan view. The first portion 52a is provided in a region overlapping with the first wiring block BK1. The second portion 52b is provided in a region overlapping with the second wiring block BK2. The third portion 52c is provided in a region overlapping with the third wiring block BK3 and the fourth wiring block BK4. The fourth portion 52d is provided in a region overlapping with the fifth wiring block BK5. The fifth portion 52e is provided in a region overlapping with the sixth wiring block BK6.

As illustrated in FIG. 8, the first drive signal supply wiring 52 and the second drive signal supply wiring 53 are provided in the same layer as the second metal layer ML2 and are made of the same material as the second metal layer ML2 is. It is sufficient that the first drive signal supply wiring 52 and the second drive signal supply wiring 53 are provided in a layer different from the first metal layer ML1. The first drive signal supply wiring 52 and the second drive signal supply wiring 53 are thereby provided in the wiring region LA so as to be electrically isolated from the wiring lines 3.

As illustrated in FIG. 6, a width (second width) of the second portion 52b in the second direction Dy is greater than a width (first width) of the first portion 52a in the second direction Dy. The second width of the second portion 52b is greater than a width (third width) of the third portion 52c in the second direction Dy. The third width of the third portion 52c is greater than the first width of the first portion 52a. The second portion 52b is provided in the first wiring region LA1 and the second wiring region LA2 and is arranged between the first wiring block BK1 and the third wiring block BK3. The first wiring block BK1 and the third wiring block BK3 are inclined in the first inclination direction D1 and the second inclination direction D2, respectively, and the second wiring block BK2 between the first wiring block BK1 and the third wiring block BK3 is composed of the first metal layer ML1. In the embodiment, the degree of freedom in arrangement of the first drive signal supply wiring 52 is thereby increased, so that the second width of the second portion 52b can be increased. The display device 1 can thereby reduce a resistance value of the first drive signal supply wiring 52 in comparison with the case in which all portions of the first drive signal supply wiring 52 are formed to have the first width.

The second drive signal supply wiring 53 is provided along the portions of the first drive signal supply wiring 52 in a region surrounded by the first drive signal supply wiring 52. The second drive signal supply wiring 53 intersects with the wiring lines 3 in the first wiring region LA1 and extends in the first direction Dx. The second drive signal supply wiring 53 is also coupled to the wiring substrate 101 at three positions.

With such a configuration, it is possible to achieve efficient layout of the wiring lines 3, the first drive signal supply wiring 52, and the second drive signal supply wiring 53 in the display device 1. Thus, the resistance value of the first drive signal supply wiring 52 in the display device 1 can be reduced while the area of the peripheral region BE is prevented from being increased.

Figure 9:
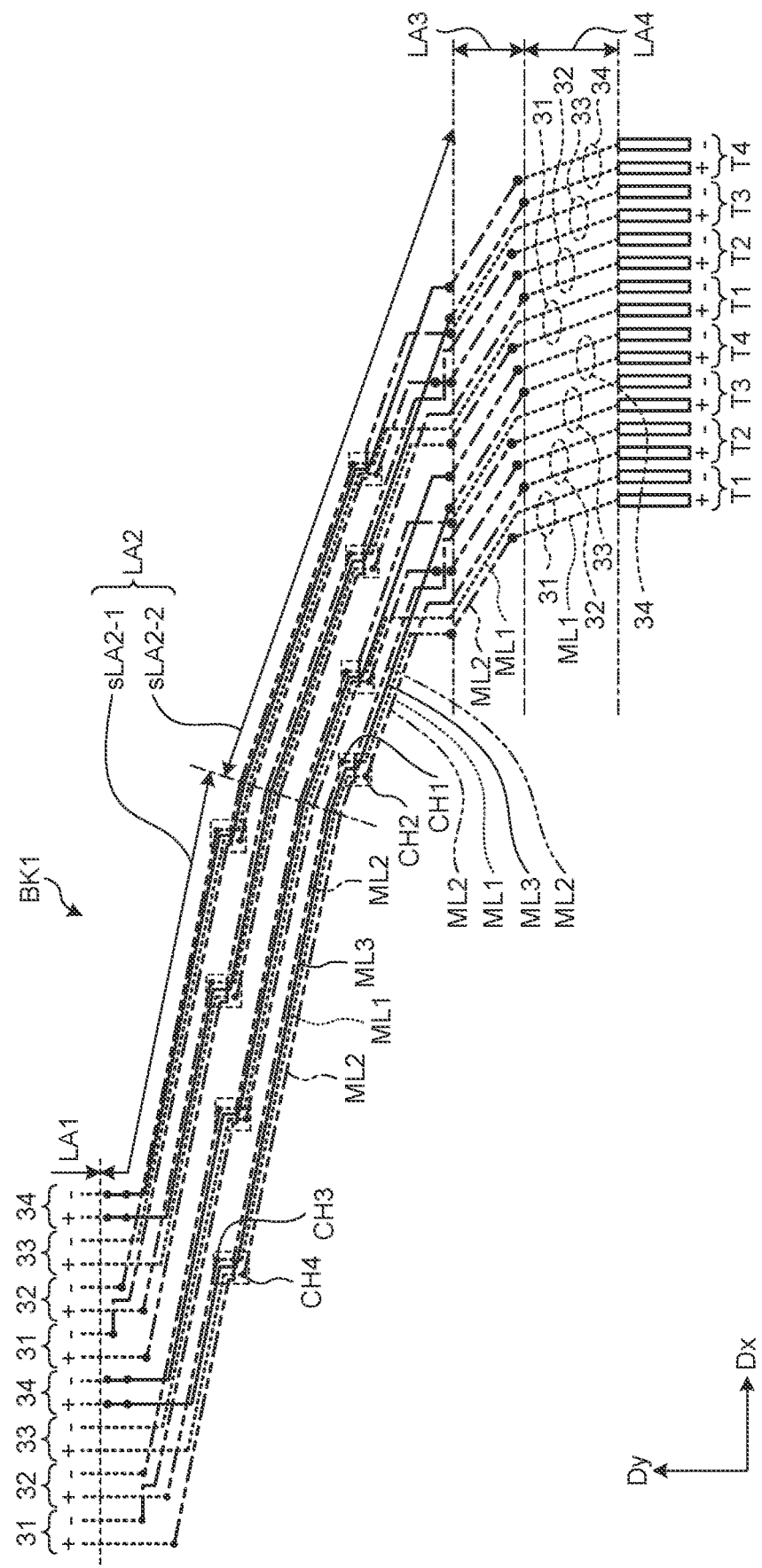
FIG. 9 is a descriptive view for explaining arrangement of first wiring lines, second wiring lines, third wiring lines, and fourth wiring lines.
Figure 10:
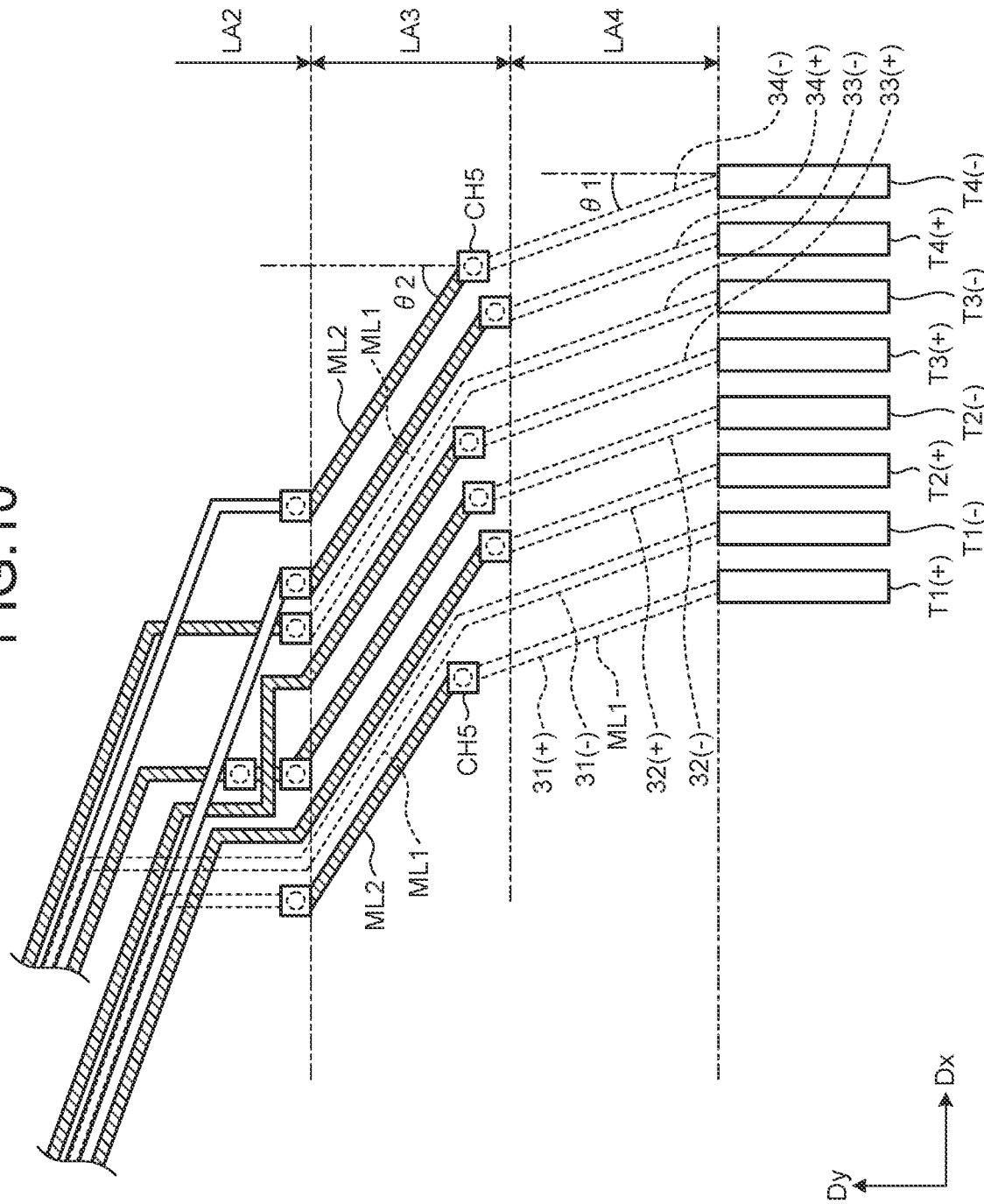
FIG. 10 is a plan view illustrating a third wiring region and a fourth wiring region in an enlarged manner.

Next, the coupling configurations of the wiring lines 3 in the respective regions will be described. FIG. 9 is a descriptive view for explaining arrangement of first wiring lines, second wiring lines, third wiring lines, and fourth wiring lines. FIG. 10 is a plan view illustrating the third wiring region and the fourth wiring region in an enlarged manner.

Figure 11:
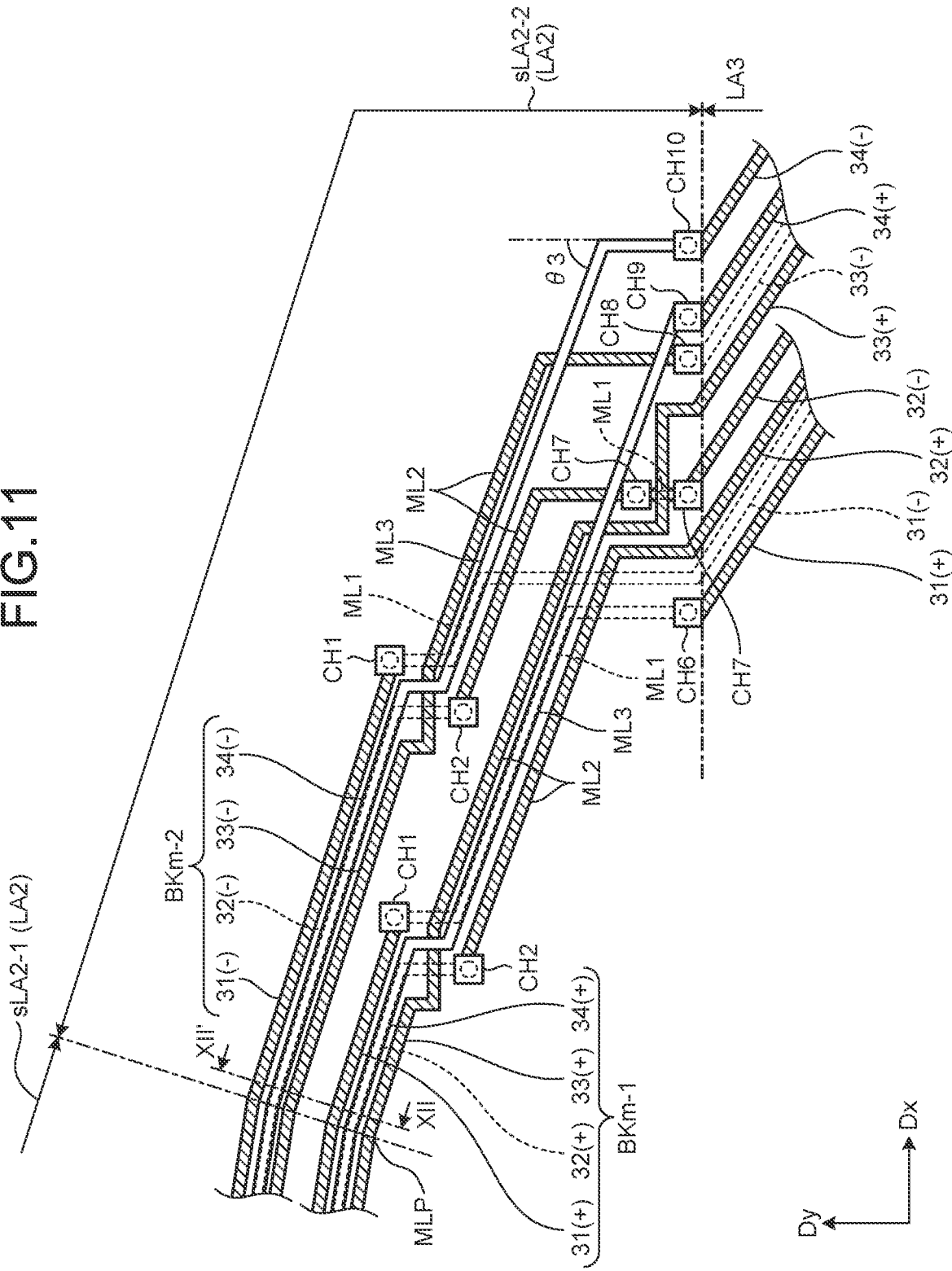
FIG. 11 is a plan view illustrating a second partial wiring region of a second wiring region in an enlarged manner.
Figure 12:
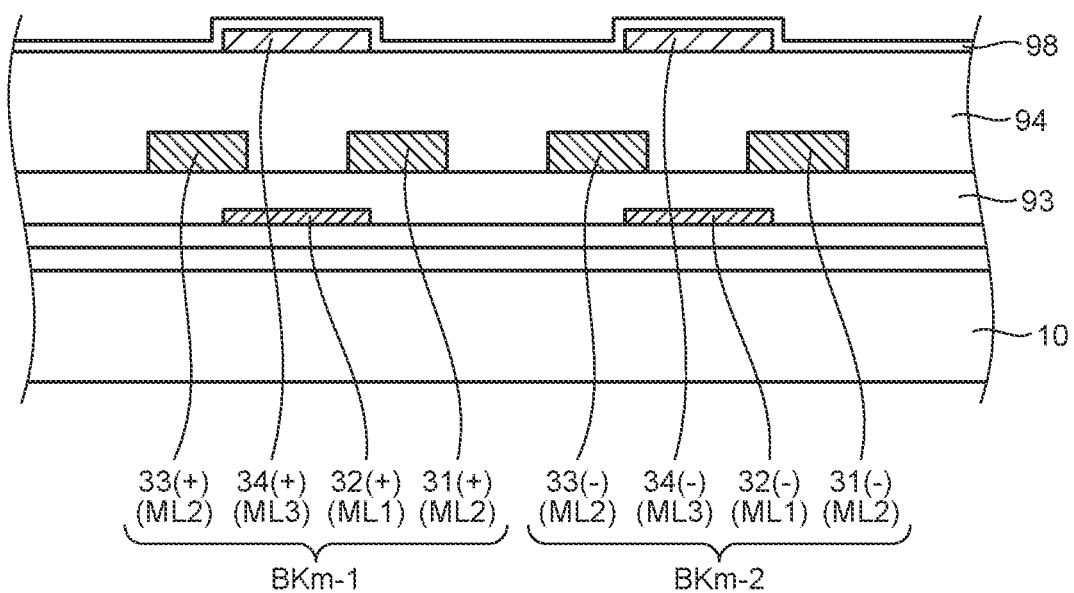
FIG. 12 is a cross-sectional view taken along line XII-XII' in FIG. 11.
Figure 13:
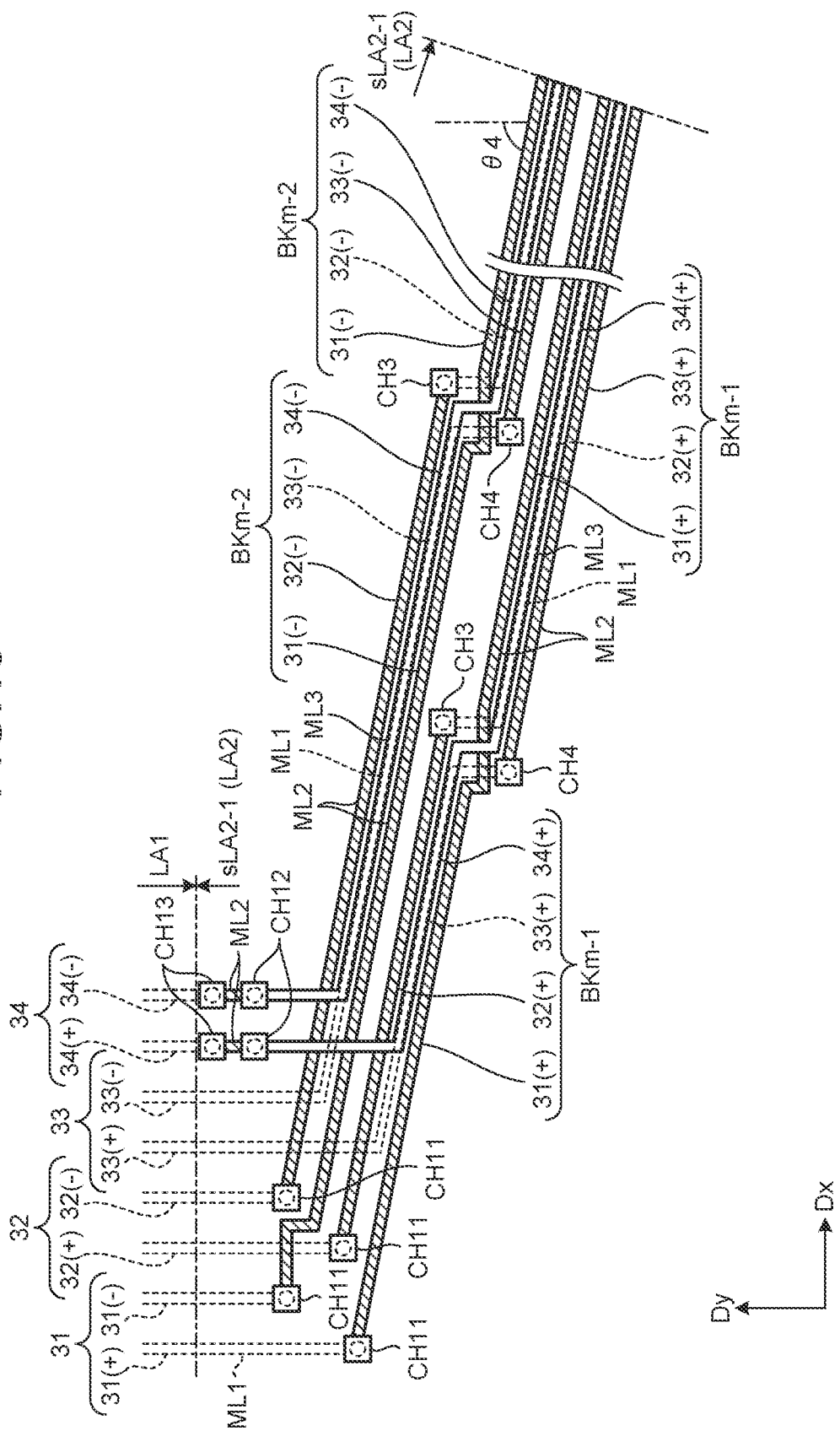
FIG. 13 is a plan view illustrating a first partial wiring region of the second wiring region in an enlarged manner.

FIG. 11 is a plan view illustrating a second partial wiring region of the second wiring region in an enlarged manner. FIG. 12 is a cross-sectional view taken along line XII-XII' in FIG. 11. FIG. 13 is a plan view illustrating a first partial wiring region of the second wiring region in an enlarged manner.

Although the first wiring block BK1 is explained with reference to FIG. 9 to FIG. 13, the explanation can be applied also to the third wiring block BK3, the fourth wiring block BK4, and the sixth wiring block BK6. FIG. 9 illustrates 16 wiring lines 3 and 16 terminals T and FIG. 10 to FIG. 13 illustrate the coupling configurations of eight wiring lines 3 in order to make the drawings easy to view. FIG. 9 to FIG. 13 are, however, schematic views, and each wiring block BK has equal to or more than 17 wiring lines 3 and equal to or more than 17 terminals T.

As illustrated in FIG. 9, the terminals T include first terminals T1, second terminals T2, third terminals T3, and fourth terminals T4. The second terminals T2 are provided between the first terminals T1 and the third terminals T3, and the third terminals T3 are provided between the second terminals T2 and the fourth terminals T4. The terminals T are repeatedly arrayed in the first direction Dx in the order of the first terminals T1, the second terminals T2, the third terminals T3, the fourth terminals T4, the first terminals T1, the second terminals T2, and so on. With reference to FIG. 2, a direction toward the side 10s3 of the first insulating substrate 10 from the side 10s4 thereof in the first direction Dx is assumed to be a first side, and a direction toward the side 10s4 from the side 10s3 is assumed to be a second side. As illustrated in FIG. 9, in the array from the first terminals T1 to the fourth terminals T4, the first terminals T1 are located on the first side of the first insulating substrate 10 and the fourth terminals T4 are located on the second side of the first insulating substrate 10 in the first direction Dx.

The wiring lines 3 include first wiring lines 31, second wiring lines 32, third wiring lines 33, and fourth wiring lines 34. The first wiring lines 31 are led out from the first terminals T1. The second wiring lines 32 are led out from the second terminals T2. The third wiring lines 33 are led out from the third terminals T3. The fourth wiring lines 34 are led out from the fourth terminals T4. The first wiring lines 31, the second wiring lines 32, the third wiring lines 33, and the fourth wiring lines 34 are repeatedly arrayed in the first direction Dx in the order of the first wiring lines 31, the second wiring lines 32, the third wiring lines 33, the fourth wiring lines 34, the first wiring lines 31, the second wiring lines 32, and so on, in the first wiring region LA1 and the fourth wiring region LA4. That is to say, the wiring lines 3 are arrayed with the same arrangement order at least between portions thereof coupled to the coupling circuit 200 and portions thereof coupled to the terminals T.

The wiring lines 3 and the terminals T include the wiring lines 3 and the terminals T for supplying video image signals of positive polarity (+) and the wiring lines 3 and the terminals T for supplying video image signals of negative polarity (−). The terminals T of positive polarity (+) and the terminals T of negative polarity (−) are alternately arrayed in the first direction Dx. The wiring lines 3 of positive polarity (+) and the negative polarity (−) are alternately arrayed in the first direction Dx in at least the portions coupled to the coupling circuit 200 and the portions coupled to the terminals T. In the following description, in FIG. 10 to FIG. 13, the wiring lines 3 and the terminals T are indicated as a first wiring line 31(+), a first wiring line 31(−), a first terminal T1(+), a first terminal T1(−), and so on in a distinguishing manner. When the positive polarity (+) and the negative polarity (−) need not be distinguished from each other for explanation, reference symbols (+) and (−) are omitted in some cases.

The video image signal of positive polarity and the video image signal of negative polarity are voltage signals having different polarities based on a potential of the display drive signal as a reference. The display device 1 performs driving by application of an alternating current, that is, alternate application of a positive voltage and a negative voltage, thereby preventing shortage of the lifetime of the pixel electrodes 11, which would otherwise occur due to deviation of positive or negative electric charges.

As illustrated in FIG. 9 and FIG. 10, each of the terminals T extends in the second direction Dy. In the fourth wiring region LA4, ends of the first wiring lines 31, the second wiring lines 32, the third wiring lines 33, and the fourth wiring lines 34 are respectively coupled to the first terminals T1, the second terminals T2, the third terminals T3, and the fourth terminals T4 at a first angle θ1 with respect to the second direction Dy. That is to say, the ends of the wiring lines 3 are coupled to the terminals T while being inclined with respect to the extension direction of the terminals T. The wiring lines 3 and the terminals T are coupled to each other on a one-to-one basis. The first angle θ1 is set such that the wiring substrate 101 (see FIG. 7) and the wiring lines 3 are not short-circuited. For example, the first angle θ1 is set such that the first wiring lines 31(−) and the wiring substrate terminal portion 101b coupled to the first terminals T1(+) are not short-circuited.

Each of the wiring lines 3 is composed of the first metal layer ML1 in the fourth wiring region LA4. None of the wiring lines 3 has the second metal layer ML2 and the third metal layer ML3 in the fourth wiring region LA4.

In the third wiring region LA3, each of the first wiring lines 31, the second wiring lines 32, the third wiring lines 33, and the fourth wiring lines 34 is inclined at a second angle θ2 with respect to the second direction Dy. The second angle θ2 is larger than the first angle θ1. Each of the first wiring lines 31(+), the second wiring lines 32, the third wiring lines 33(+), and the fourth wiring lines 34 is composed of the second metal layer ML2 in the third wiring region LA3. To be specific, each of the first wiring lines 31(+), the second wiring lines 32, the third wiring lines 33(+), and the fourth wiring lines 34 includes a fifth contact portion CH5. The fifth contact portion CH5 couples the first metal layer ML1 in the fourth wiring region LA4 and the second metal layer ML2 in the third wiring region LA3. The first wiring lines 31(−) and the third wiring lines 33(−) have no fifth contact portion CH5 in the third wiring region LA3 and are each composed of the first metal layer ML1.

As described above, in the third wiring region LA3, the wiring lines 3 composed of the first metal layer ML1 and the wiring lines 3 having no first metal layer ML1 and composed of the second metal layer ML2 are included. The degree of freedom in the arrangement of the wiring lines 3 is therefore increased more in the third wiring region LA3 than in the fourth wiring region LA4. The arrangement pitch of the wiring lines 3 in the third wiring region LA3 can be less than the arrangement pitch of the wiring lines in the fourth wiring region LA4 in plan view. The fifth contact portions CH5 adjacent in the first direction Dx are arranged such that positions thereof in the second direction Dy differ from each other. With this arrangement manner, of the adjacent wiring lines 3 (for example, the second wiring line 32(+) and the second wiring line 32(−)), one wiring line 3 (second wiring line 32(−)) can be prevented from making contact with the fifth contact portion CH5 provided in the other wiring line 3 (second wiring line 32(+)).

As illustrated in FIG. 9, the second wiring region LA2 includes a first partial wiring region sLA2-1 and a second partial wiring region sLA2-2. The first partial wiring region sLA2-1 is coupled to the first wiring region LA1. The second partial wiring region sLA2-2 is provided between the first partial wiring region sLA2-1 and the third wiring region LA3.

As illustrated in FIG. 11, in the second partial wiring region sLA2-2, each of the first wiring lines 31, the second wiring lines 32, the third wiring lines 33, and the fourth wiring lines 34 is inclined at a third angle θ3. The third angle θ3 is larger than the second angle θ2.

The first wiring line 31(+) includes a sixth contact portion CH6. The sixth contact portion CH6 couples the second metal layer ML2 in the third wiring region LA3 and the first metal layer ML1 in the second partial wiring region sLA2-2. Similarly, the second wiring line 32(−) and the third wiring line 33(−) respectively include a seventh contact portion CH7 and an eighth contact portion CH8 and are each coupled to a metal layer different from those in the third wiring region LA3.

The fourth wiring line 34(+) and the fourth wiring line 34(−) respectively include a ninth contact portion CH9 and a tenth contact portion CH10. Each of the ninth contact portion CH9 and the tenth contact portion CH10 couple the second metal layer ML2 in the third wiring region LA3 and the third metal layer ML3 in the second partial wiring region sLA2-2. Each of the fourth wiring line 34(+) and the fourth wiring line 34(−) is thereby composed of the third metal layer ML3 in the second wiring region LA2.

In the second partial wiring region sLA2-2, the wiring lines 3 are provided so as to intersect with each other in plan view and the arrangement order of the wiring lines 3 is changed. As an example, the first wiring line 31(−) extends in the second direction Dy from the third wiring region LA3 and intersects with the second wiring line 32(+), the fourth wiring line 34(+), the third wiring line 33(+), and the second wiring line 32(−). The second wiring line 32(−) is composed of the first metal layer ML1 in a region between the two seventh contact portions CH7 aligned in the second direction Dy, and the second wiring line 32(−) composed of the first metal layer ML1 intersects with the third wiring line 33(+) extending in the first direction Dx.

In the second partial wiring region sLA2-2, the wiring lines 3 are collectively arranged in positive wiring blocks BKm-1 and negative wiring blocks BKm-2. Each positive wiring block BKm-1 includes the first wiring line 31(+), the second wiring line 32(+), the third wiring line 33(+), and the fourth wiring line 34(+). Each negative wiring block BKm-2 includes the first wiring line 31(−), the second wiring line 32(−), the third wiring line 33(−), and the fourth wiring line 34(−). In each of the positive wiring blocks BKm-1 and the negative wiring blocks BKm-2, four wiring lines 3 having the same polarity are arranged in an adjacent manner. The display device 1 can thereby reduce the parasitic capacitance between the wiring lines 3.

In the positive wiring block BKm-1, the first wiring line 31(+) includes a first contact portion CH1 coupling the first metal layer ML1 and the second metal layer ML2. The second wiring line 32(+) includes a second contact portion CH2 coupling the first metal layer ML1 and the second metal layer ML2. The third wiring line 33(+) composed of the second metal layer ML2 and the fourth wiring line 34(+) composed of the third metal layer ML3 are provided between the first contact portion CH1 and the second contact portion CH2 in plan view. The third wiring line 33(+) extends in the first direction Dx and intersects with the first wiring line 31(+), the second wiring line 32(+), and the fourth wiring line 34(+) in an region between the first contact portion CH1 and the second contact portion CH2. This configuration is similarly applied to the negative wiring block BKm-2, and the duplicate explanation thereof is omitted.

As illustrated in FIG. 12, the fourth wiring line 34(+) composed of the third metal layer ML3 is provided so as to overlap with the second wiring line 32(+) composed of the first metal layer ML1. In FIG. 11 and other figures, gaps between the wiring lines 3 are provided for making the drawings easy to view. Parts of the wiring lines 3 may overlap with each other as illustrated in FIG. 12. For example, an end portion of the third wiring line 33(+) composed of the second metal layer ML2 in the width direction is provided between the fourth wiring line 34(+) and the second wiring line 32(+) in the direction perpendicular to the first insulating substrate 10. An end portion of the first wiring line 31(+) composed of the second metal layer ML2 in the width direction is provided between the fourth wiring line 34(+) and the second wiring line 32(+) in the direction perpendicular to the first insulating substrate 10. The widths of the fourth wiring line 34(+) and the second wiring line 32(+) are greater than a gap between the third wiring line 33(+) and the first wiring line 31(+).

As illustrated in FIG. 11, each of the wiring lines 3 in the positive wiring block BKm-1 and the negative wiring block BKm-2 is bent in a bending portion MLP. As illustrated in FIG. 13, in the first partial wiring region sLA2-1, each of the wiring lines 3 in the positive wiring block BKm-1 and the negative wiring block BKm-2 is inclined at a fourth angle θ4. The fourth angle θ4 is larger than the third angle θ3.

In the positive wiring block BKm-1, the second wiring line 32(+) includes a third contact portion CH3 coupling the first metal layer ML1 and the second metal layer ML2. The third wiring line 33(+) includes a fourth contact portion CH4 coupling the second metal layer ML2 and the first metal layer ML1. As illustrated in FIG. 9, the first contact portion CH1 and the second contact portion CH2 are located on the terminals T side in the second direction Dy, and the third contact portion CH3 and fourth contact portion CH4 are located on the first wiring region LA1 side, that is, the display region DA side in the second direction Dy. The first contact portion CH1 is located on the second side of the first insulating substrate 10, that is, the side closer to the side 10s4 (see FIG. 2) relative to the second contact portion CH2 in the first direction Dx. The third contact portion CH3 is located on the second side relative to the fourth contact portion CH4. As illustrated in FIG. 11, the first wiring line 31(+) composed of the second metal layer ML2 and the fourth wiring line 34(+) composed of the third metal layer ML3 are provided between the third contact portion CH3 and the fourth contact portion CH4 in plan view. The first wiring line 31(+) extends in the first direction Dx and intersects with the second wiring line 32(+), the third wiring line 33(+), and the fourth wiring line 34(+) in an region between the third contact portion CH3 and the fourth contact portion CH4. This configuration is similarly applied to the negative wiring block BKm-2, and the duplicate explanation thereof is omitted.

The wiring lines 3 intersect with each other in a region between the third and the fourth contact portions CH3 and CH4 and the first wiring region LA1. The arrangement order of the wiring lines 3 is thereby changed, and the first wiring line 31(+), the first wiring line 31(−), the second wiring line 32(+), the second wiring line 32(−), the third wiring line 33(+), the third wiring line 33(−), the fourth wiring line 34(+), and the fourth wiring line 34(−) are arranged in the order as listed.

In the first partial wiring region sLA2-1, each of the first wiring lines 31 and the second wiring lines 32 includes an eleventh contact portion CH11 in an region close to the first wiring region LA1. The eleventh contact portion CH11 couples the second metal layer ML2 and the first metal layer ML1. Each of the first wiring lines 31 and the second wiring lines 32 is composed of the first metal layer ML1 and extends in the second direction Dy in the first wiring region LA1.

Each of the third wiring lines 33 is composed of the first metal layer ML1 in a region from the fourth contact portion CH4 to the first wiring region LA1 and extends in the second direction Dy in the first wiring region LA1.

Each of the fourth wiring lines 34 includes a twelfth contact portion CH12 and a thirteenth contact portion CH13. The twelfth contact portion CH12 couples the third metal layer ML3 and the second metal layer ML2. The thirteenth contact portion CH13 couples the second metal layer ML2 and the first metal layer ML1. With this configuration, the fourth wiring line 34 composed of the third metal layer ML3 is coupled to the first metal layer ML1 through the second metal layer ML2. The fourth wiring line 34 is composed of the first metal layer ML1 and extends in the second direction Dy in the first wiring region LA1.

As illustrated in FIG. 9, FIG. 11, and FIG. 13, each of the first wiring lines 31, the second wiring lines 32, and the third wiring lines 33 is composed of the first metal layer ML1 and the second metal layer ML2 in the second wiring region LA2. Each of the fourth wiring lines 34 is composed of the third metal layer ML3 in the second wiring region LA2. In other words, the first wiring line 31 includes the first contact portion CH1 in the second wiring region LA2. The second wiring line 32 includes the second contact portion CH2 and the third contact portion CH3 in the second wiring region LA2. The third wiring line 33 includes the fourth contact portion CH4 in the second wiring region LA2.

A sheet resistance of the first metal layer ML1 is higher than a sheet resistance of the second metal layer ML2. A sheet resistance of the second metal layer ML2 is lower than a sheet resistance of the third metal layer ML3. In the embodiment, the first contact portions CH1, the second contact portions CH2, the third contact portions CH3, and the fourth contact portions CH4 are provided at positions dividing the lengths of the wiring lines 3 in the second wiring region LA2 into three equal sections. That is to say, the total length of the first metal layer ML1 and the total length of the second metal layer ML2 are equivalent among the first wiring line 31, the second wiring line 32, and the third wiring line 33. Difference in resistance among the first wiring line 31, the second wiring line 32, the third wiring line 33, and the fourth wiring line 34 is thereby reduced. Accordingly, display performance of the display device 1 can be prevented from being lowered.

The configuration illustrated in FIG. 9 to FIG. 13 is an example, and the arrangement, angles, widths, arrangement pitches, and the like of the wiring lines 3 can be appropriately changed. Each of the positive wiring block BKm-1 and the negative wiring block BKm-2 includes four wiring lines 3 but is not limited thereto, and five or more wiring lines 3 having the same polarity may be collectively arrayed.

First Modification

Figure 14:
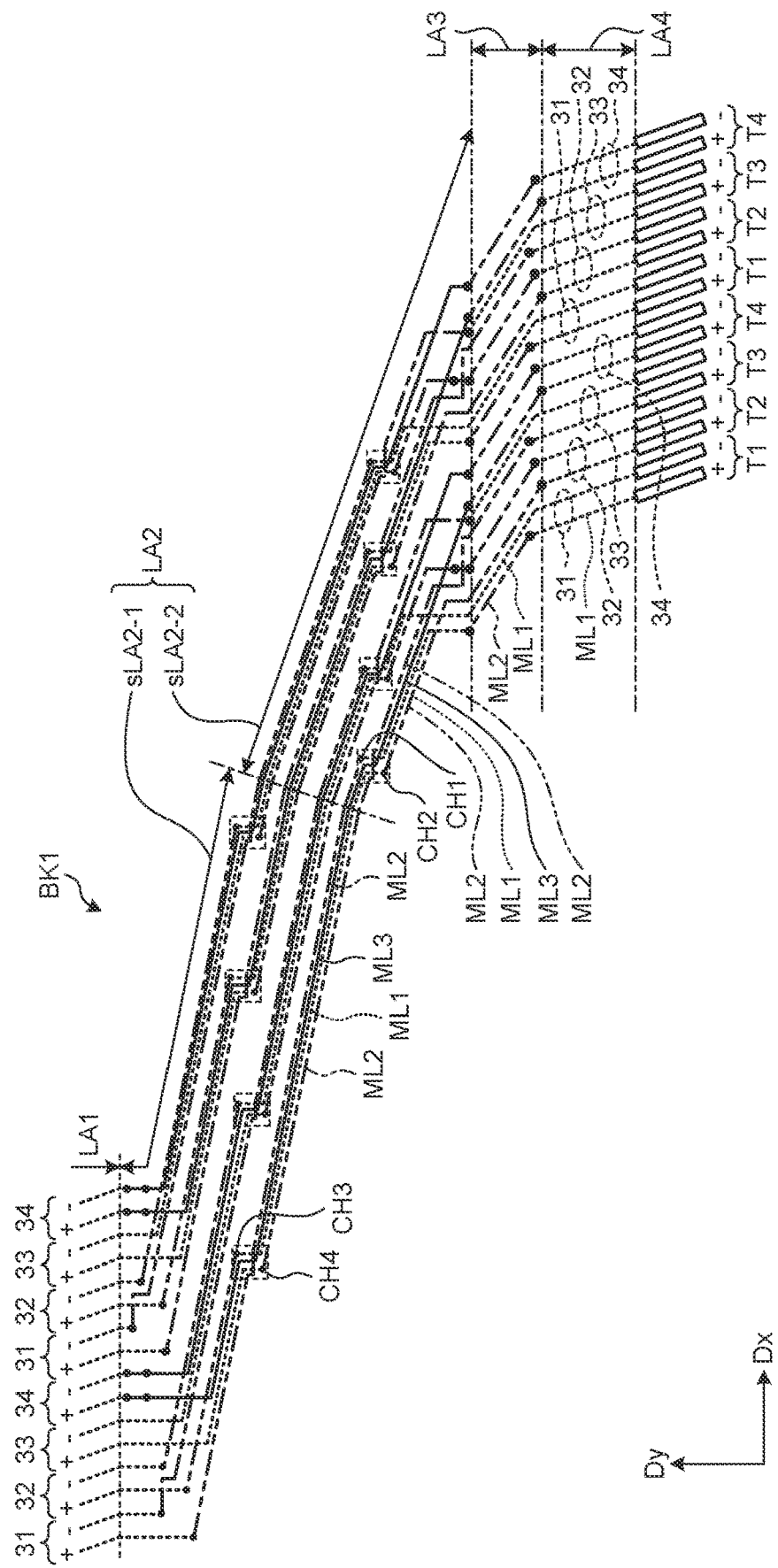
FIG. 14 is a view illustrating a first modification of the configuration illustrated in FIG. 9.

FIG. 14 is a view illustrating a first modification of the configuration illustrated in FIG. 9. As illustrated in FIG. 14, the modification is different from the above-mentioned embodiment in points that the terminals T are provided so as to be inclined with respect to the second direction Dy and the wiring lines 3 led out in the first wiring region LA1 are also inclined with respect to the second direction Dy. The terminals T extend in the same direction as the extension direction of the wiring lines 3 in the fourth wiring region LA4. That is to say, an angle formed by the extension direction of the terminals T and the second direction Dy is equal to the first angle θ1 (see FIG. 10). The inclination angle of the terminals T is not limited thereto and may be different from the first angle θ1 of the wiring lines 3 in the fourth wiring region LA4. The inclination angle may be different from one another. For example, the terminals T may have different inclination angles among the terminals coupled to the first wiring block BK1 to the sixth wiring block BK6 illustrated in FIG. 6. Similarly, the wiring lines 3 led out in the first wiring region LA1 may also have different inclination angles among the first wiring block BK1 to the sixth wiring block BK6.

The third metal layer ML3 of each fourth wiring line 34 illustrated in FIG. 12 is not limited to being made of the metal material in the same layer as the sensor wiring lines 51 (see FIG. 5). For example, the third metal layer ML3 of each fourth wiring line 34 can be formed in the same layer as the light shielding layer 67 (see FIG. 5) made of the metal material and can be made of the same metal material as the light shielding layer 67 is. Alternatively, the same metal material as that of the light shielding layer 67 can be used for any of the first wiring lines 31, the second wiring lines 32, and the third wiring lines 33 in the same layer as the light shielding layer 67 made of the metal material. In this case, for example, wiring of the light shielding layer 67 made of the metal material may be used instead of the first metal layer ML1, the wiring of the light shielding layer 67 made of the metal material may be used instead of the second metal layer ML2, or the first metal layer ML1 may be stacked on the wiring of the light shielding layer 67 made of the metal material.

Second Modification

Figure 15:
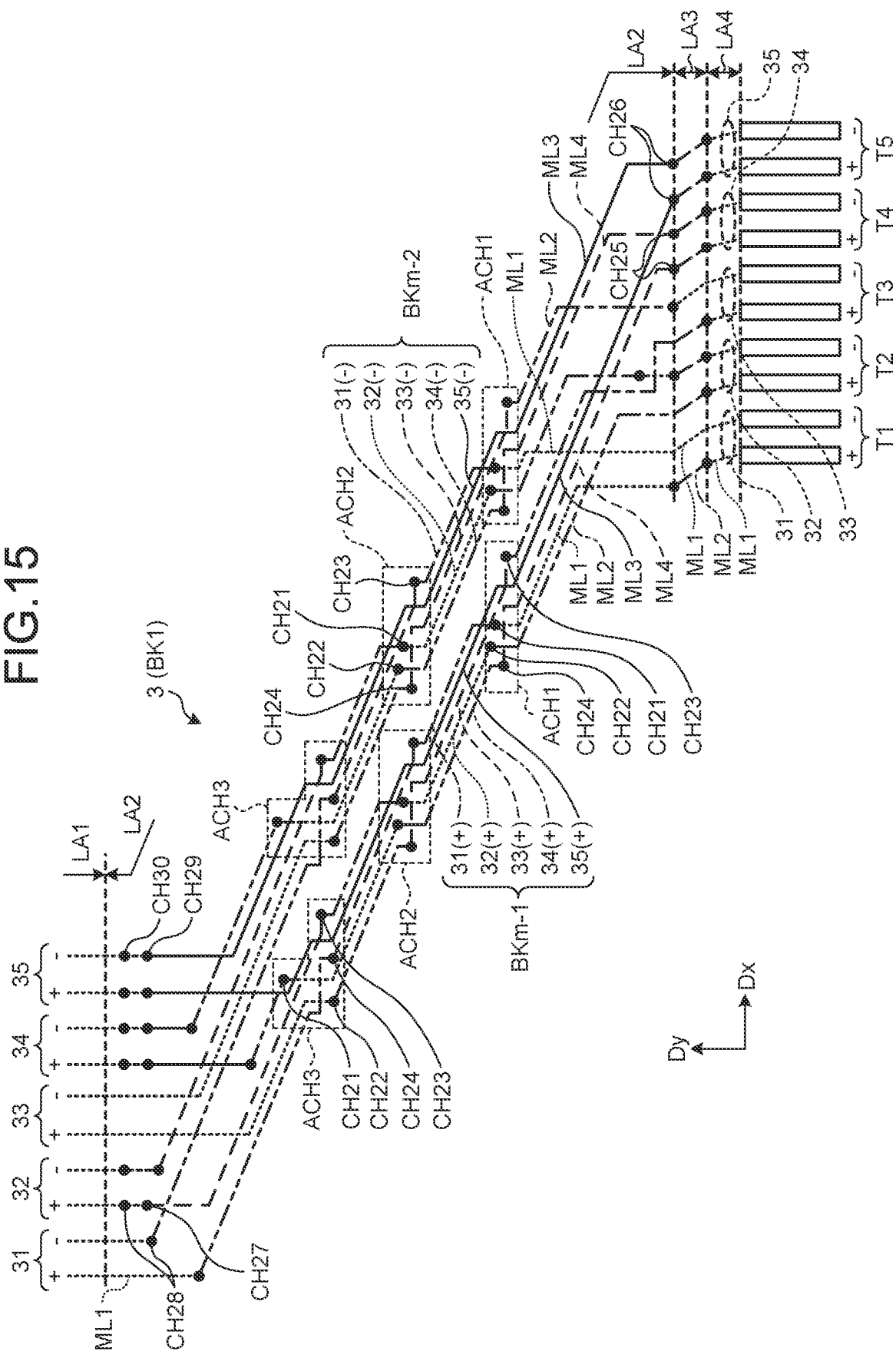
FIG. 15 is a view illustrating a second modification of the configuration illustrated in FIG. 9.

FIG. 15 is a view illustrating a second modification of the configuration illustrated in FIG. 9. In the following description, the same reference numerals denote the same components described in the above-mentioned embodiment, and the duplicate explanation thereof is omitted.

As illustrated in FIG. 15, the terminals T include the first terminals T1 to fifth terminals T5 in the second modification. The second terminals T2, the third terminals T3, and the fourth terminals T4 are provided between the first terminals T1 and the fifth terminals T5. The second terminals T2 are provided between the first terminals T1 and the third terminals T3, and the fourth terminals T4 are provided between the third terminals T3 and the fifth terminals T5. Although FIG. 15 illustrates a set of the first terminals T1 to the fifth terminals T5, the terminals T are repeatedly arrayed in the first direction Dx in the order of the first terminals T1, the second terminals T2, the third terminals T3, the fourth terminals T4, the fifth terminals T5, the first terminals T1, the second terminals T2, and so on. In a manner similar to the embodiment illustrated in FIG. 9, in the array from the first terminals T1 to the fifth terminals T5, the first terminals T1 are located on the first side of the first insulating substrate 10 and the fifth terminals T5 are located on the second side of the first insulating substrate 10 in the first direction Dx.

The wiring lines 3 include the first wiring lines 31 to fifth wiring lines 35. The fifth wiring lines 35 are led out from the fifth terminals T5. Although FIG. 15 illustrates a set of the first wiring lines 31 to the fifth wiring lines 35, the first wiring lines 31 to the fifth wiring lines 35 are repeatedly arrayed in the first direction Dx in the order of the first wiring lines 31, the second wiring lines 32, the third wiring lines 33, the fourth wiring lines 34, the fifth wiring lines 35, the first wiring lines 31, the second wiring lines 32, and so on in the first wiring region LA1 and the fourth wiring region LA4.

The wiring line 3 has a fourth metal layer ML4 in addition to the first metal layer ML1, the second metal layer ML2, and the third metal layer ML3 provided in the different layers. The fourth metal layer ML4 can be formed in the same layer as the light shielding layer 67 (see FIG. 5) and can be made of the same metal material as the light shielding layer 67 is. The material of the fourth metal layer ML4 is, for example, molybdenum tungsten (MoW). The multilayered structure of the first metal layer ML1 to the fourth metal layer ML4 will be described later.

In a coupling portion between the third wiring region LA3 and the second wiring region LA2, each of the fourth wiring line 34(+) and the fourth wiring line 34(−) includes a 25th contact portion CH25. The 25th contact portions CH25 couple the second metal layer ML2 in the third wiring region LA3 and the fourth metal layer ML4 in the second wiring region LA2. In a coupling portion between the first wiring region LA1 and the second wiring region LA2, each of the second wiring line 32(+) and the second wiring line 32(−) includes a 27th contact portion CH27 and a 28th contact portion CH28. The 27th contact portion CH27 couples the fourth metal layer ML4 and the second metal layer ML2. The 28th contact portion CH28 couples the second metal layer ML2 and the first metal layer ML1. The first wiring lines 31 to the fourth wiring lines 34 each including the fourth metal layer ML4 are thereby coupled to the first wiring region LA1.

In the coupling portion between the third wiring region LA3 and the second wiring region LA2, each of the fifth wiring line 35(+) and the fifth wiring line 35(−) includes a 26th contact portion CH26. The 26th contact portion CH26 couples the second metal layer ML2 in the third wiring region LA3 and the third metal layer ML3 in the second wiring region LA2. In the coupling portion between the first wiring region LA1 and the second wiring region LA2, each of the fifth wiring line 35(+) and the fifth wiring line 35(−) includes a 29th contact portion CH29 and a 30th contact portion CH30. The 29th contact portion CH29 couples the third metal layer ML3 and the second metal layer ML2. The 30th contact portion CH30 couples the second metal layer ML2 and the first metal layer ML1. With this configuration, the fifth wiring line 35(+) and the fifth wiring line 35(−) are composed of the third metal layer ML3 in the second wiring region LA2.

The wiring lines 3 are collectively arranged in the positive wiring blocks BKm-1 and the negative wiring blocks BKm-2. Each positive wiring block BKm-1 includes the first wiring line 31(+) to the fifth wiring line 35(+). Each negative wiring block BKm-2 includes the first wiring line 31(−) to the fifth wiring line 35(−). Each of the positive wiring blocks BKm-1 and the negative wiring blocks BKm-2 has five wiring lines 3 having the same polarity.

In the second wiring region LA2, the wiring lines 3 include first contact regions ACH1, second contact regions ACH2, and third contact regions ACH3. Each of the first contact regions ACH1, the second contact regions ACH2, and the third contact regions ACH3 includes a 21st contact portion CH21, a 22nd contact portion CH22, a 23rd contact portion CH23, and a 24th contact portion CH24. Each of the 21st contact portion CH21 to the 24th contact portion CH24 couples two metal layers provided in different layers among the first metal layer ML1, the second metal layer ML2, and the fourth metal layer ML4.

Each of the first wiring lines 31 to the fourth wiring lines 34 is thereby coupled to the different metal layer in the first contact region ACH1, the second contact region ACH2, and the third contact region ACH3. As a result, each of the first wiring lines 31 to the fourth wiring lines 34 is composed of the first metal layer ML1, the second metal layer ML2, and the fourth metal layer ML4 in the second wiring region LA2. As illustrated in FIG. 15, in the second modification, the first contact regions ACH1, the second contact regions ACH2, and the third contact regions ACH3 are provided at positions dividing the length of the wiring lines 3 in the second wiring region LA2 into four equal sections.

Figure 16:
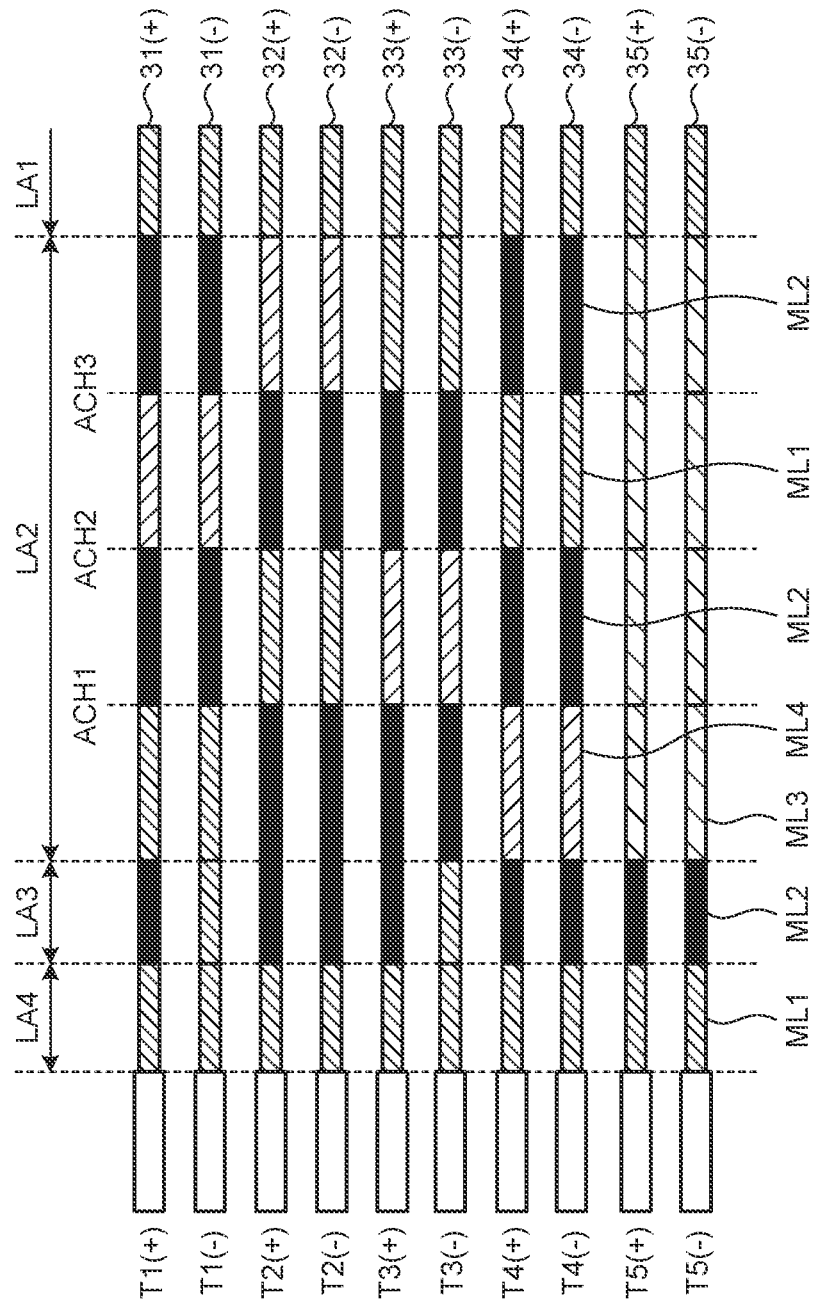
FIG. 16 is a descriptive view for schematically explaining the coupling configurations of wiring lines in the second modification.

FIG. 16 is a descriptive view for schematically explaining the coupling configurations of the wiring lines in the second modification. FIG. 16 illustrates the metal layers with different hatch patterns in order to distinguish the first metal layer ML1 to the fourth metal layer ML4 forming the wiring lines. As illustrated in FIG. 16, each of the first wiring lines 31 to the fourth wiring lines 34 is composed of the first metal layer ML1 of one section, the second metal layer ML2 of two sections, and the fourth metal layer ML4 of one section in the second wiring region LA2.

To be specific, each of the first wiring lines 31 is configured such that, in the second wiring region LA2, the first metal layer ML1, the second metal layer ML2, the fourth metal layer ML4, and the second metal layer ML2 are coupled from the terminal T side to the first wiring region LA1 side in the order as listed. Each of the second wiring lines 32 is configured such that the second metal layer ML2, the first metal layer ML1, the second metal layer ML2, and the fourth metal layer ML4 are coupled in the order as listed. Each of the third wiring lines 33 is configured such that the second metal layer ML2, the fourth metal layer ML4, the second metal layer ML2, and the first metal layer ML1 are coupled in the order as listed. Each of the fourth wiring lines 34 is configured such that the fourth metal layer ML4, the second metal layer ML2, the first metal layer ML1, and the second metal layer ML2 are coupled in the order as listed. Each of the fifth wiring lines 35 does not have the fourth metal layer ML4 and is composed of the third metal layer ML3.

That is to say, the total length of the first metal layer ML1, the total length of the second metal layer ML2, and the total length of the fourth metal layer ML4 are equivalent among the first wiring lines 31, the second wiring lines 32, the third wiring lines 33, and the third wiring lines 34. On the other hand, the fifth wiring lines 35 are each composed of the third metal layer ML3 and do not have the first metal layer ML1, the second metal layer ML2, and the fourth metal layer ML4 in the second wiring region LA2.

A sheet resistance of the first metal layer ML1 is higher than a sheet resistance of the second metal layer ML2. A sheet resistance of the second metal layer ML2 is lower than a sheet resistance of the third metal layer ML3. A sheet resistance of the fourth metal layer ML4 is equivalent to that of the first metal layer ML1. Difference in the resistance among the first wiring lines 31 to the fifth wiring lines 35 is thereby reduced. Accordingly, display performance of the display device 1 can be prevented from being lowered.

Although schematically illustrated in FIG. 16, to be more specific, the second wiring line 32(−) is configured such that the first metal layer ML1 is provided as an intermediate portion between the third wiring region LA3 and the first contact region ACH1, as illustrated in FIG. 15. The first metal layer ML1, which functions as a bridge, is used as a part of the second wiring line 32(−) because the second wiring line 32(−) and the third wiring line 33(+) adjacent to each other cannot intersect with each other in the same second metal layer ML2.

Each of the second wiring lines 32(+) and 32(−) is configured such that the second metal layer ML2 is provided as an intermediate portion between the third contact region ACH3 and the first wiring region LA1, to be more specific, between the 27th contact hole CH27 and the 28th contact hole 28. This configuration is employed because the second metal layer ML2 is preferably interposed to avoid direct coupling between the fourth metal layer ML4 and the first metal layer ML1.

Similarly, each of the fourth wiring lines 34(+) and 34(−) is configured such that the third metal layer ML3 is provided as an intermediate portion between the third contact region ACH3 and the first wiring region LA1. The third metal layer ML3 is simply a bridge for running over the other wiring lines in the same layer, and deviation in the sheet resistance is reduced due to the bridge.

Similarly, each of the fifth wiring lines 35(+) and 35(−) is configured such that the second metal layer ML2 is provided as an intermediate portion between the third contact region ACH3 and the first wiring region LA1, to be more specific, between the 29th contact hole CH29 and the 30th contact hole CH30. This configuration is employed because the second metal layer ML2 is preferably interposed to avoid direct coupling between the third metal layer ML3 and the first metal layer ML1.

Even in consideration of the intermediate portions of these wiring lines, the difference in the resistance among the first wiring lines 31 to the fifth wiring lines 35 is still small.

Figure 17:
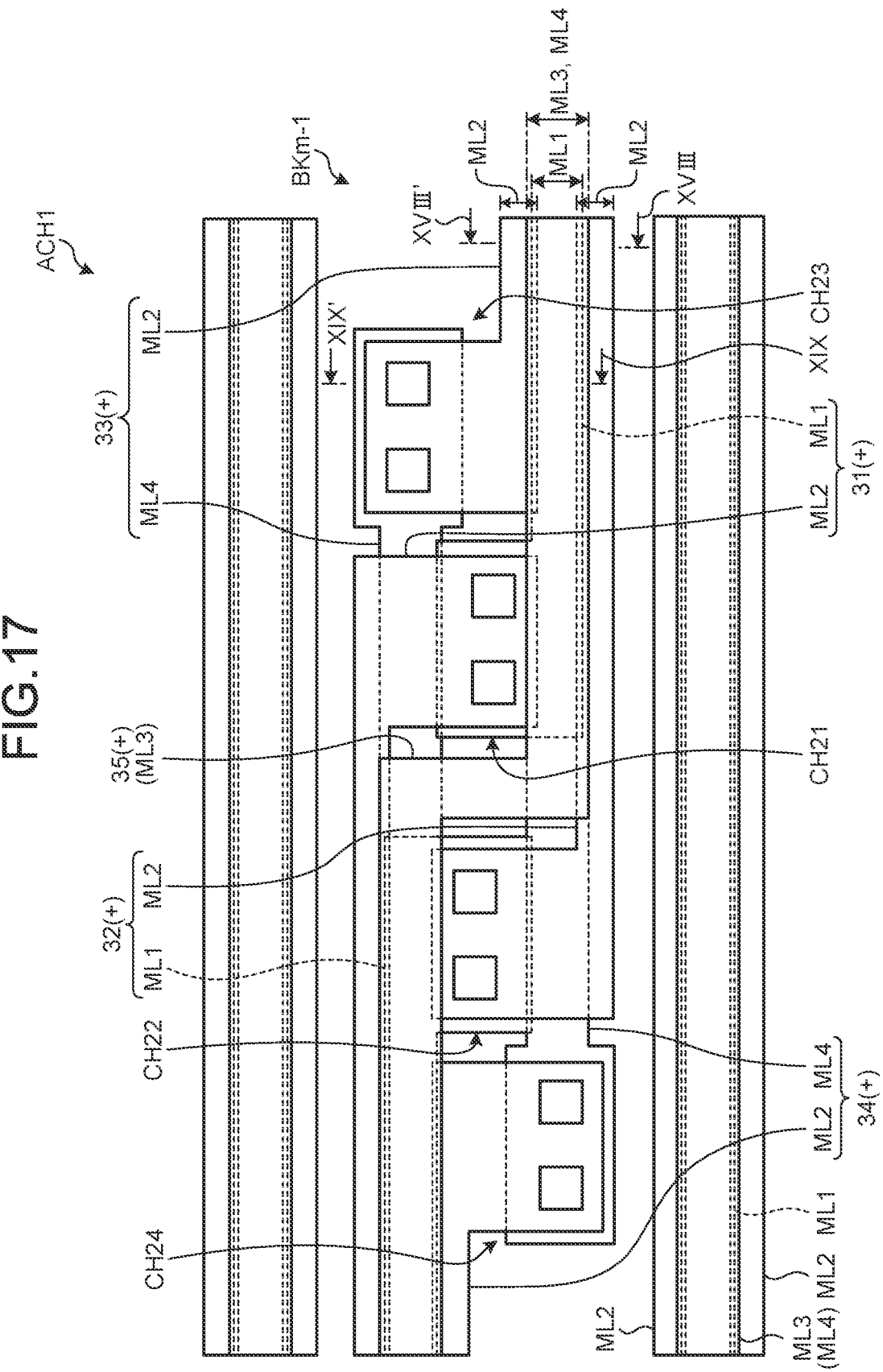
FIG. 17 is a plan view illustrating a contact region in an enlarged manner.
Figure 18:
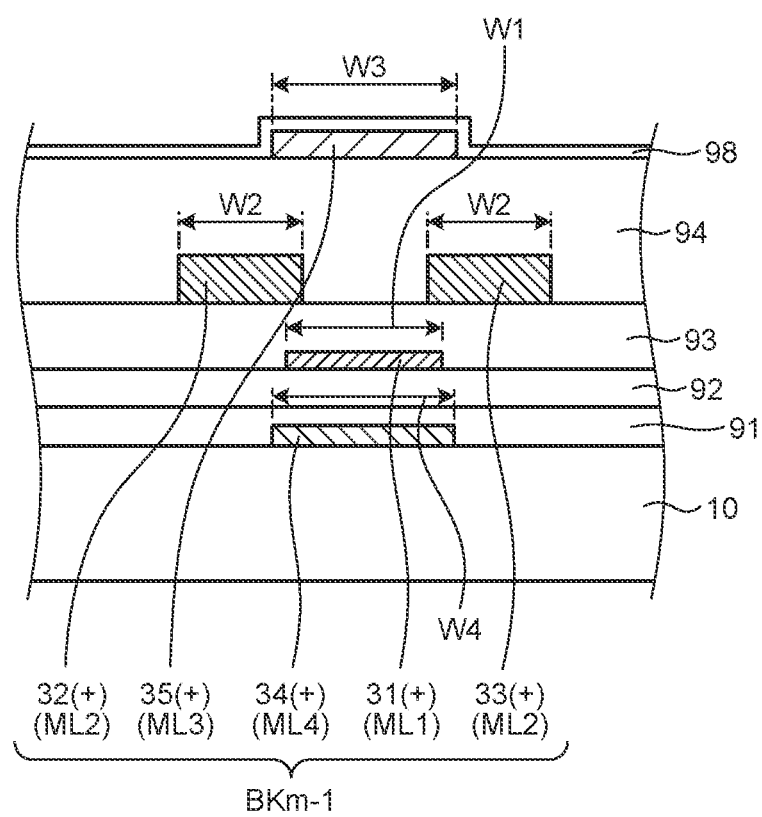
FIG. 18 is a cross-sectional view taken along line XVIII-XVIII' in FIG. 17.
Figure 19:
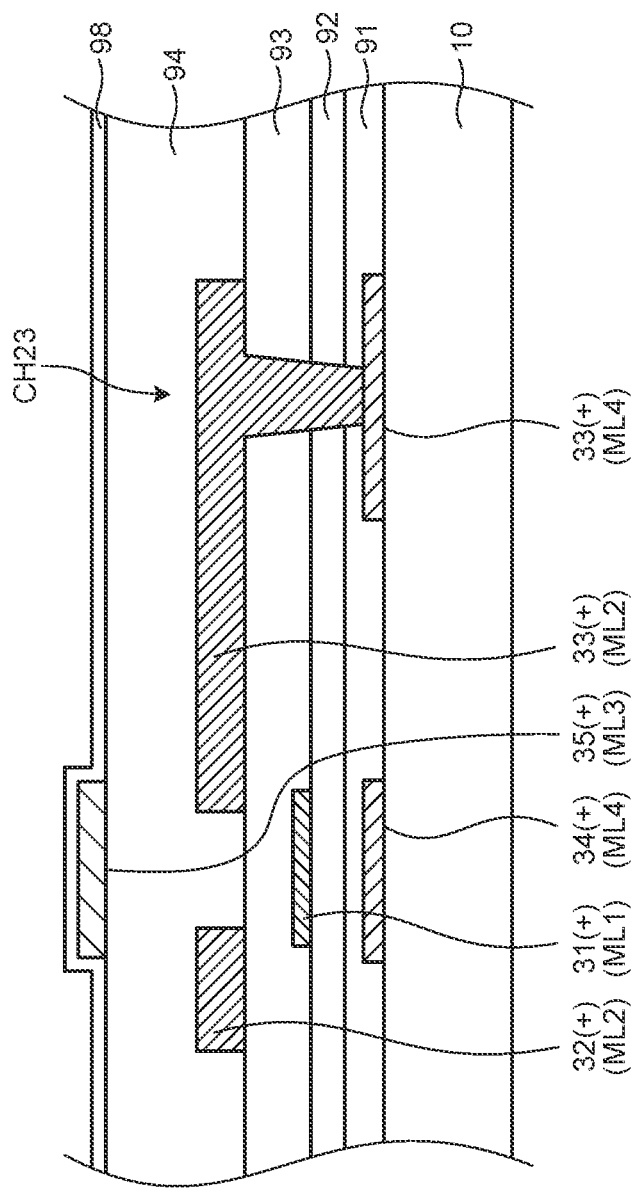
FIG. 19 is a cross-sectional view taken along line XIX-XIX' in FIG. 17.

Next, a specific example of the configuration of the contact regions will be described. FIG. 17 is a plan view illustrating the contact region in an enlarged manner. FIG. 18 is a cross-sectional view taken along line XVIII-XVIII' in FIG. 17. FIG. 19 is a cross-sectional view taken along line XIX-XIX' in FIG. 17. FIG. 17 to FIG. 19 illustrate the first contact region ACH1 of the positive wiring block BKm-1 as a configuration example of the contact regions. Explanation with reference to FIG. 17 to FIG. 19 can be applied also to the first contact region ACH1 of the negative wiring block BKm-2.

As illustrated in FIG. 17, the first wiring line 31(+) includes the 21st contact portion CH21. The 21st contact portion CH21 couples the first metal layer ML1 and the second metal layer ML2. The second wiring line 32(+) includes the 22nd contact portion CH22. The 22nd contact portion CH22 couples the second metal layer ML2 and the first metal layer ML1. The third wiring line 33(+) includes the 23rd contact portion CH23. The 23rd contact portion CH23 couples the second metal layer ML2 and the fourth metal layer ML4. The fourth wiring line 34(+) includes the 24th contact portion CH24. The 24th contact portion CH24 couples the fourth metal layer ML4 and the second metal layer ML2.

The 21st contact portion CH21 and the 22nd contact portion CH22 are arranged between the 23rd contact portion CH23 and the 24th contact portion CH24 in plan view. The fifth wiring line 35(+) is provided so as to pass through between the 21st contact portion CH21 and the 22nd contact portion CH22. The fifth wiring line 35(+) is formed by coupling, in a crank shape, a portion extending so as to overlap with the fourth metal layer ML4 of the third wiring line 33(+) and a portion extending so as to overlap with the fourth metal layer ML4 of the fourth wiring line 34(+).

Although FIG. 17 illustrates the first contact region ACH1, a similar configuration can be applied also to the second contact region ACH2 and the third contact region ACH3. In this case, the combination of the first wiring line 31 to the fourth wiring line 34 and the 21st contact portion CH21 to the 24th contact portion CH24 is different from that of the first contact region ACH1. For example, in the third contact region ACH3, as illustrated in FIG. 15, the first wiring line 31(+) includes the 24th contact portion CH24. The second wiring line 32(+) includes the 23rd contact portion CH23. The third wiring line 33(+) includes the 22nd contact portion CH22. The fourth wiring line 34(+) includes the 21st contact portion CH21.

As illustrated in FIG. 18, the fourth metal layer ML4 is arranged on the lower side of the first metal layer ML1, that is, between the first insulating substrate 10 and the first metal layer ML1. The fifth wiring line 35(+) composed of the third metal layer ML3 is provided so as to overlap with the first wiring line 31(+), the second wiring line 32(+), the third wiring line 33(+), and the fourth wiring line 34(+). A width W3 of the fifth wiring line 35(+) composed of the third metal layer ML3 is greater than a width W1 of the first wiring line 31(+) composed of the first metal layer ML1. The width W3 of the fifth wiring line 35(+) is equal to or greater than a width W4 of the fourth wiring lines 34(+) composed of the fourth metal layer ML4. A width W2 of the second wiring line 32(+) and the third wiring line 33(+) composed of the second metal layer ML2 is less than the widths W1, W3, and W4. A gap between the second wiring line 32(+) and the third wiring line 33(+) is less than the widths W1, W3, and W4.

As illustrated in FIG. 19, the third wiring line 33(+) composed of the second metal layer ML2 is coupled to the third wiring line 33(+) composed of the fourth metal layer ML4 through the 23rd contact portion CH23. The 23rd contact portion CH23 includes a contact hole penetrating through the first insulating film 91, the second insulating film 92, and the third insulating film 93.

With the above-mentioned configuration, each positive wiring block BKm-1 having the five wiring lines 3 can be efficiently arranged. In other words, in the second modification, the area of the positive wiring block BKm-1 in plan view can be reduced in comparison with the case in which the positive wiring block BKm-1 is composed of three metal layers. The fifth wiring line 35 is not limited to being provided in the crank shape as illustrated in FIG. 17. The fifth wiring line 35 composed of the third metal layer ML3 is located in an uppermost layer of the metal layers. Limitation in the arrangement of the fifth wiring line 35 due to the contact portion is therefore relaxed, thereby improving the degree of freedom in the arrangement of the fifth wiring line 35.

While the preferred embodiment of the present disclosure has been described above, the present disclosure is not limited by the embodiment. Contents disclosed in the embodiment are merely examples, and various changes can be made in a range without departing from the gist of the present disclosure. It is needless to say that appropriate changes in a range without departing from the gist of the present disclosure belong to the technical range of the present disclosure. At least one of various omission, replacement, and change of the components can be performed in a range without departing from the gist of the embodiment and modifications described above.

For example, a display device according to the present disclosure can employ the following aspects.

(1) A display device comprising:
a substrate;
a display region in which a plurality of pixels are provided;
a peripheral region located between an edge of the substrate and the display region;
a plurality of signal lines supplying signals to respective switching elements provided in the pixels;
a plurality of terminals arrayed in a first direction in the peripheral region of the substrate;
a plurality of wiring lines coupling the terminals and the signal lines in the peripheral region; and
a first metal layer, a second metal layer, a third metal layer, a first insulating film, and a second insulating film that are provided in the peripheral region, wherein the first metal layer, the second metal layer, and the third metal layer are provided in different layers in a direction perpendicular to the substrate, and wherein the first insulating film is provided between the first metal layer and the second metal layer, and the second insulating film is provided between the second metal layer and the third metal layer,
wherein the terminals include a first terminal, a second terminal, a third terminal, and a fourth terminal, the second terminal is provided between the first terminal and the third terminal, and the third terminal is provided between the second terminal and the fourth terminal,
wherein the wiring lines include a first wiring line led out from the first terminal, a second wiring line led out from the second terminal, a third wiring line led out from the third terminal, and a fourth wiring line led out from the fourth terminal,
wherein the first wiring line includes a first contact portion coupling the first metal layer and the second metal layer,
wherein the second wiring line includes a second contact portion coupling the first metal layer and the second metal layer, and
wherein the third wiring line composed of the second metal layer and the fourth wiring line composed of the third metal layer are provided between the first contact portion and the second contact portion in plan view.

(2) The display device according to (1), wherein
the second wiring line includes a third contact portion coupling the first metal layer and the second metal layer,
the third wiring line includes a fourth contact portion coupling the first metal layer and the second metal layer, and
the first wiring line composed of the second metal layer and the fourth wiring line composed of the third metal layer are provided between the third contact portion and the fourth contact portion in plan view.

(3) The display device according to (2), wherein
the first contact portion and the second contact portion are located on the terminals side in a second direction intersecting with the first direction,
the third contact portion and the fourth contact portion are located on the display region side in the second direction,
the first terminal is located on a first side of the substrate in the first direction,
the fourth terminal is located on a second side of the substrate in the first direction,
the first contact portion is located on the second side relative to the second contact portion, and
the third contact portion is located on the second side relative to the fourth contact portion.

A display device according to the present disclosure can employ the following aspects.

(4) A display device comprising:
a substrate;
a display region in which a plurality of pixels are provided;
a peripheral region located between an edge of the substrate and the display region;
a plurality of signal lines supplying signals to respective switching elements provided in the pixels;
a plurality of terminals arrayed in a first direction in the peripheral region of the substrate;
a plurality of wiring lines coupling the terminals and the signal lines in the peripheral region; and
a first metal layer, a second metal layer, a third metal layer, a fourth metal layer, a first insulating film (third insulating film 93), a second insulating film (fourth insulating film 94), and a third insulating film (first insulating film 91) that are provided in the peripheral region, wherein the first metal layer, the second metal layer, the third metal layer, and the fourth metal layer are provided in different layers in a direction perpendicular to the substrate, and wherein the first insulating film is provided between the first metal layer and the second metal layer, a second insulating film is provided between the second metal layer and the third metal layer, and a third insulating film is provided between the first metal layer and the fourth metal layer,
wherein the terminals include a first terminal, a second terminal, a third terminal, a fourth terminal, and a fifth terminal, the second terminal is provided between the first terminal and the third terminal, and the fourth terminal is provided between the third terminal and the fifth terminal,
wherein the wiring lines include a first wiring line led out from the first terminal, a second wiring line led out from the second terminal, a third wiring line led out from the third terminal, a fourth wiring line led out from the fourth terminal, and a fifth wiring line led out from the fifth terminal, and
wherein the fifth wiring line composed of the third metal layer is arranged so as to overlap with the first wiring line composed of the first metal layer and the fourth wiring line composed of the fourth metal layer in plan view.

(5) The display device according to (4),
wherein the first wiring line includes a first contact portion (21st contact portion CH21) coupling the first metal layer and the second metal layer,
wherein the second wiring line includes a second contact portion (22nd contact portion CH22) coupling the first metal layer and the second metal layer,
wherein the third wiring line includes a third contact portion (23rd contact portion CH23) coupling the second metal layer and the fourth metal layer,
wherein the fourth wiring line includes a fourth contact portion (24th contact portion CH24) coupling the second metal layer and the fourth metal layer, and
wherein the fifth wiring line composed of the third metal layer is provided between the first contact portion and the second contact portion in plan view.

What is claimed is:

1. A display device comprising:
a substrate;
a display region in which a plurality of pixels are provided;
a peripheral region located between an edge of the substrate and the display region;
a plurality of signal lines configured to supply signals to respective switching elements provided in the pixels;
a plurality of terminals arrayed in a first direction in the peripheral region of the substrate;
a plurality of wiring lines coupling the terminals and the signal lines in the peripheral region; and
a first metal layer, a second metal layer, a third metal layer, a first insulating film, and a second insulating film that are provided in the peripheral region,
wherein the first metal layer, the second metal layer, and the third metal layer are provided in different layers in a direction perpendicular to the substrate,
wherein the first insulating film is provided between the first metal layer and the second metal layer, and the second insulating film is provided between the second metal layer and the third metal layer,
wherein the terminals include a first terminal, a second terminal, a third terminal, and a fourth terminal,
wherein the second terminal is provided between the first terminal and the third terminal,
wherein the third terminal is provided between the second terminal and the fourth terminal,
wherein the wiring lines include a first wiring line led out from the first terminal, a second wiring line led out from the second terminal, a third wiring line led out from the third terminal, and a fourth wiring line led out from the fourth terminal,
wherein the first wiring line includes a first contact portion coupling the first metal layer and the second metal layer,
wherein the second wiring line includes a second contact portion coupling the first metal layer and the second metal layer, and
wherein the third wiring line composed of the second metal layer and the fourth wiring line composed of the third metal layer are provided between the first contact portion and the second contact portion in plan view.

2. The display device according to claim 1,
wherein the second wiring line includes a third contact portion coupling the first metal layer and the second metal layer,
wherein the third wiring line includes a fourth contact portion coupling the first metal layer and the second metal layer, and
wherein the first wiring line composed of the second metal layer and the fourth wiring line composed of the third metal layer are provided between the third contact portion and the fourth contact portion in plan view.

3. The display device according to claim 2,
the first contact portion and the second contact portion are provided to a terminal side in a second direction intersecting the first direction,
the third contact portion and the fourth contact portion are provided to a display region side in the second direction,
the first terminal is provided to a first side of the substrate in the first direction,
the fourth terminal is provided to a second side of the substrate in the first direction,
the first contact portion is provided to the second side relative to the second contact portion, and
the third contact portion is provided to the second side relative to the fourth contact portion.

4. A display device comprising:
a substrate;
a display region in which a plurality of pixels are provided;
a peripheral region located between an edge of the substrate and the display region;
a plurality of signal lines configured to supply signals to respective switching elements provided in the pixels;
a plurality of terminals arrayed in a first direction in the peripheral region of the substrate;
a plurality of wiring lines coupling the terminals and the signal lines in the peripheral region;
a first metal layer, a second metal layer, a third metal layer, a fourth metal layer, a first insulating film, a second insulating film, and a third insulating film that are provided in the peripheral region,
wherein the first metal layer, the second metal layer, the third metal layer, and the fourth metal layer are provided in different layers in a direction perpendicular to the substrate,
wherein the first insulating film is provided between the first metal layer and the second metal layer, the second insulating film is provided between the second metal layer and the third metal layer, and the third insulating film is provided between the first metal layer and the fourth metal layer,
wherein the terminals include a first terminal, a second terminal, a third terminal, a fourth terminal, and a fifth terminal,
wherein the second terminal is provided between the first terminal and the third terminal,
wherein the fourth terminal is provided between the third terminal and the fifth terminal,
wherein the wiring lines include a first wiring line led out from the first terminal, a second wiring line led out from the second terminal, a third wiring line led out from the third terminal, a fourth wiring line led out from the fourth terminal, and a fifth wiring line led out from the fifth terminal, and
wherein the fifth wiring line composed of the third metal layer is provided overlapping the first wiring line composed of the first metal layer and the fourth wiring line composed of the fourth metal layer in plan view.

5. The display device according to claim 4,
wherein the first wiring line includes a first contact portion coupling the first metal layer and the second metal layer,
wherein the second wiring line includes a second contact portion coupling the first metal layer and the second metal layer,
wherein the third wiring line includes a third contact portion coupling the second metal layer and the fourth metal layer,
wherein the fourth wiring line includes a fourth contact portion coupling the second metal layer and the fourth metal layer, and
wherein the fifth wiring line composed of the third metal layer is provided between the first contact portion and the second contact portion in plan view.

* * * * *